United States Patent
Kwon et al.

(10) Patent No.: US 11,091,569 B2
(45) Date of Patent: Aug. 17, 2021

(54) METHOD FOR PREPARING SUPPORTED HYBRID METALLOCENE CATALYST

(71) Applicant: LG Chem, Ltd., Seoul (KR)

(72) Inventors: Hyun Jee Kwon, Daejeon (KR); Seungmi Lee, Daejeon (KR); Poeun Kim, Daejeon (KR); Ki Soo Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/954,719

(22) PCT Filed: Feb. 7, 2019

(86) PCT No.: PCT/KR2019/001535
§ 371 (c)(1),
(2) Date: Jun. 17, 2020

(87) PCT Pub. No.: WO2019/156482
PCT Pub. Date: Aug. 15, 2019

(65) Prior Publication Data
US 2020/0385497 A1    Dec. 10, 2020

(30) Foreign Application Priority Data

Feb. 8, 2018  (KR) .................. 10-2018-0015903
Feb. 1, 2019  (KR) .................. 10-2019-0013833

(51) Int. Cl.
*C08F 10/02*    (2006.01)

(52) U.S. Cl.
CPC .................... *C08F 10/02* (2013.01)

(58) Field of Classification Search
CPC .... C08F 10/02; C08F 4/6592; C08F 4/65925; C08F 4/65904; C08F 4/65912; C08F 2420/02; C08F 4/65916; C08F 4/65927; C08F 110/02; C08F 2500/18; C08F 2500/24; C08F 210/16; C08F 210/14; C08F 2500/12; B01J 37/0209
USPC ........................................................ 526/116
See application file for complete search history.

(56) References Cited

U.S. PATENT DOCUMENTS

| | | | |
|---|---|---|---|
| 6,683,016 B1 | 1/2004 | Youn et al. | |
| 2006/0116490 A1 | 6/2006 | Paczkowski et al. | |
| 2011/0105705 A1 | 5/2011 | Han et al. | |
| 2012/0252991 A1* | 10/2012 | Kim ........................ | C08F 10/00 526/114 |
| 2016/0304637 A1 | 10/2016 | Lee et al. | |
| 2018/0208693 A1 | 7/2018 | Sung et al. | |

FOREIGN PATENT DOCUMENTS

| | | |
|---|---|---|
| KR | 20000026665 A | 5/2000 |
| KR | 20070092217 A | 9/2007 |
| KR | 20090103251 A | 10/2009 |
| KR | 20110043464 A | 4/2011 |
| KR | 20120076156 A | 7/2012 |
| KR | 20150062145 A | 6/2015 |
| KR | 20160010351 A | 1/2016 |
| KR | 20170106110 A | 9/2017 |
| WO | WO 2006/080817 A1 * | 8/2006 |

OTHER PUBLICATIONS

International Search Report for Application No. PCT/KR2019/001535 dated May 24, 2019, 2 pages.

* cited by examiner

*Primary Examiner* — William K Cheung
(74) *Attorney, Agent, or Firm* — Lerner, David, Littenberg, Krumholz & Mentlik, LLP

(57) ABSTRACT

The present disclosure relates to a method for preparing a supported hybrid metallocene catalyst, and the catalyst is prepared by supporting a first metallocene compound, supporting a cocatalyst by a separate-input method in which primarily adding a part at 100° C. to 150° C. and secondarily adding the rest at −5° C. to 40° C., and then supporting a second metallocene compound, thereby improving a supporting rate of the cocatalyst in the supported catalyst and maintaining high catalytic activity. Therefore, the present disclosure can effectively prepare a polyolefin with improved processability which exhibits increased molecular weight distribution while having high morphology (reduced fine powder), high bulk density and improved settling efficiency.

20 Claims, No Drawings

METHOD FOR PREPARING SUPPORTED HYBRID METALLOCENE CATALYST

CROSS-REFERENCE TO RELATED APPLICATIONS

This application is a national phase entry under 35 U.S.C. § 371 of International Application No. PCT/KR2019/001535 filed Feb. 7, 2019, which claims priority from Korean Patent Applications No. 10-2018-0015903 filed Feb. 8, 2018, and No. 10-2019-0013833 filed Feb. 1, 2019, all of which are incorporated herein by reference.

TECHNICAL FIELD

The present disclosure relates to a method for preparing a supported hybrid metallocene catalyst and a method for preparing a polyolefin using the same.

BACKGROUND

The polymerization process of an olefin is generally classified into a high pressure process, a solution process, a slurry process, a gas-phase process, and the like, and there have been various efforts to prepare olefin polymers having desired properties by applying various metallocene catalysts to the polymerization process.

The metallocene catalyst for the preparation method of polyethylene using a slurry and gas-phase polymerization process should be firmly fixed to a suitable support in order not to generate fouling due to leaching in a reactor. Particularly, since a bulk density of the polymer is closely related to productivity in a reactor, not only the activity of the catalyst but also the bulk density of the polymer should be high.

It is usual in the preparation of a supported metallocene catalyst not only to use a highly active metallocene catalyst for increasing catalytic activity but also to increase an amount of aluminoxane, a cocatalyst, supported on a support. However, in the case of the highly active supported catalyst, the polymerization occurs first on the surface of the support and the resulting polymer is crystallized, thereby inhibiting monomer diffusion. Thus, a hollow polymer is formed and the bulk density is generally lowered. In order to solve this problem, there has been an attempt for controlling a rate of diffusion into the inside of the support of the monomer such as ethylene by carrying out pre-polymerization in advance at a low temperature and a low pressure, but there was a problem of installing an additional polymerization reactor. Further, there is a supporting method for improving a supporting efficiency by treating hydroxy groups on the surface of the support with aluminum chloride, etc., but this method increases the catalyst preparation cost and may decrease uniformity of the catalyst due to side reactions.

Meanwhile, the metallocene catalyst includes a main catalyst having a metallocene compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, due to the single site characteristics. The stereoregularity, copolymerization characteristics, molecular weight, crystallinity, etc. of the resulting polymer may be controlled by changing a ligand structure of the catalyst and polymerization conditions. However, when such a metallocene catalyst is supported on a solid support to increase a bulk density of the polymer such as polyolefin, a catalytic activity and a molecular weight distribution of the polymer are often lowered.

Therefore, to solve the above drawbacks, there is a continuous demand for a method for preparing a supported hybrid metallocene catalyst capable of preparing a polyolefin having both improved bulk density and molecular weight distribution while maintaining its highly active catalytic characteristic.

DETAILED DESCRIPTION OF THE INVENTION

Technical Problem

The present disclosure is to provide a method for preparing a supported hybrid metallocene catalyst capable of preparing a polyolefin having both improved bulk density and molecular weight distribution while maintaining its highly active catalytic characteristic.

In addition, the present disclosure is to provide a method for preparing a polyolefin using the catalyst prepared by the method described above.

Technical Solution

According to one embodiment of the present disclosure, there is provided a method for preparing a supported hybrid metallocene catalyst, including the steps of: supporting at least one first metallocene compound on a silica support;

supporting an aluminum-based cocatalyst compound by contacting the silica support on which the first metallocene compound is supported with at least one aluminum-based cocatalyst compound; and supporting at least one second metallocene compound on the silica support on which the aluminum-based cocatalyst is supported;

wherein the aluminum-based cocatalyst is supported on the silica support by a separate-input method in which 50% by weight to 90% by weight of a whole input is primarily added at a temperature of 100° C. to 150° C., and the rest of the whole input is secondarily added at a temperature of −5° C. to 40° C.

According to another embodiment of the present disclosure, there is provided a method for preparing a polyolefin, including the step of polymerizing olefinic monomers in the presence of the supported hybrid metallocene catalyst prepared as described above.

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the method for preparing a supported hybrid metallocene catalyst and the method for preparing a polyolefin using the same will be described in more detail.

First, the supported hybrid metallocene catalyst of the present disclosure refers to a catalyst on which at least one first metallocene compound and at least one second metallocene compound are supported. In addition, the supported hybrid metallocene catalyst of the present disclosure is characterized in that an aluminum-based cocatalyst is supported together with the metallocene compound. The supported hybrid metallocene catalyst of the present disclosure may further include a borate-based compound as a second cocatalyst.

The present disclosure relates to a method for preparing a supported hybrid metallocene catalyst capable of preparing a polyolefin having both improved bulk density and molecular weight distribution while maintaining its highly active catalytic characteristic.

According to one embodiment of the present disclosure, there is provided a method of preparing a supported hybrid metallocene catalyst including the steps of: supporting at least one first metallocene compound on a silica support; supporting an aluminum-based cocatalyst compound by contacting the silica support on which the first metallocene compound is supported with at least one aluminum-based cocatalyst compound; and supporting at least one second metallocene compound on the silica support on which the aluminum-based cocatalyst is supported, wherein the aluminum-based cocatalyst is supported on the silica support at different temperatures by a separate-input method.

That is, in the preparation of the supported hybrid metallocene catalyst of the present disclosure, a cocatalyst is divided and added so that a relatively large amount of the cocatalyst is distributed inside the support in order to make a fine structure of the polymer and to control a particle size of the polymer for maximizing the formation of active sites and controlling a molecular weight distribution (MWD) and comonomer distribution. In addition, the catalyst of the present disclosure is prepared by supporting a first metallocene compound, and then primarily adding a part of a cocatalyst at a high temperature of 100° C. to 150° C. and secondarily adding the rest of the cocatalyst at a temperature of −5° C. to 40° C., thereby improving processability by achieving increased bulk density and broad molecular weight distribution while maintaining its highly active catalytic characteristic.

Particularly, the first metallocene compound is supported on the silica support, and then the aluminum-based cocatalyst compound is supported thereon by a separate-input method in which 50% by weight to 90% by weight of a whole input of the cocatalyst compound is primarily added at a temperature of about 100° C. to 150° C., and the rest of the whole input is secondarily added at a temperature of −5° C. to 40° C., thereby improving a supporting rate of the cocatalyst in the supported catalyst. Therefore, the present disclosure can effectively prepare a polyolefin having a high bulk density, a broad molecular weight distribution and thus improved processability, wherein the morphology (reduced fine powder) and bulk density of the resulting polymer are increased during a slurry loop pilot process evaluation and the settling efficiency is improved, resulting in increased activity during process operation and significantly increased ethylene load.

According to this method, the present disclosure can provide the supported metallocene catalyst having a specific parameter regarding a content of Al/Si in the support. Preferably, the present disclosure may provide the supported metallocene catalyst that is composed of: an outer layer including an area from each surface to a ⅓ position of the particle diameter toward the center and an inner layer including the rest of the area from the ⅓ position of the particle diameter to the center, in a cross-section of the supported catalyst particle, and includes a silica support having an aluminum-based cocatalyst compound supported on the inside and surface of the support; and two or more metallocene compounds supported on the silica support. For example, a content ratio (wt %, % by weight) of Al/Si elements of the inner layer is 65% or more compared to a content ratio (wt %, % by weight) of Al/Si elements of the outer layer. In particular, the present disclosure may achieve a broad molecular weight distribution (MWD) with a high bulk density by supporting at least one first metallocene compound on a silica support in advance. In addition, the present disclosure may increase a supporting rate of Al by dividing and adding the aluminum cocatalyst at a high temperature.

The supported hybrid metallocene catalyst according to the present disclosure is characterized in that a larger amount of the aluminum-based cocatalyst than the prior art penetrates into the support and is chemically bonded with the inside and the pores of the silica support, and a substantial amount of the same is physically bonded to the surface of the support. That is, conventionally, there was a small amount of the aluminum-based cocatalyst that penetrates into the support and is chemically bonded. However, the present disclosure is to support more cocatalyst on the inside of the inner layer than the prior art by dividedly supporting the aluminum-based cocatalyst compound on the support. Therefore, the supported metallocene catalyst of the present disclosure composed of the inner layer and the outer layer includes a large amount of the aluminum-based cocatalyst compound in the inner layer, and thus it can improve the density density compared to the prior art and easily control the catalytic activity.

In the supported hybrid metallocene catalyst according to the present disclosure having such characteristics, a content ratio (wt %) of Al/Si elements of the inner layer is 65% or more, or preferably 90% to 150%, compared to a content ratio (wt %) of Al/Si elements of the outer layer, when the silica support on which the aluminum-based cocatalyst compound is supported is subjected to elemental analysis. This means that a large amount of the aluminum-based cocatalyst is deeply penetrated into the inner layer of the silica support.

The method for preparing a supported hybrid metallocene catalyst of the present disclosure includes the steps of: supporting at least one first metallocene compound on a silica support; supporting an aluminum-based cocatalyst compound by contacting the silica support on which the first metallocene compound is supported with at least one aluminum-based cocatalyst compound; and supporting at least one second metallocene compound on the silica support on which the aluminum-based cocatalyst is supported.

Particularly, in the present disclosure, the first metallocene compound is first supported on the silica support, followed by the aluminum-based cocatalyst, wherein the aluminum-based cocatalyst is dividedly supported at different temperatures while changing the temperature from a high temperature to a low temperature.

Hereinafter, each step that can be included in the method of the present disclosure will be described in more detail.

Firstly, a silica support having morphology suitable for a Phillips loop slurry process is selected in the present disclosure. The present disclosure optimizes the binding of the metallocene catalyst and the alkylaluminoxane, which is a cocatalyst, supported on the support by selectively controlling the amount of silanol groups and siloxane groups of the silica support through calcination conditions.

In order for the cocatalyst (for example, MAO) to penetrate into the silica due to the decrease in viscosity at a high temperature, to chemically react with hydroxyl groups, that is, OH groups, of the silica, and to be physically adsorbed onto the surface of the silica, the calcination may be carried out in a temperature range from a temperature where moisture disappears at the surface of the silica to a temperature where hydroxyl groups, that is, OH groups completely disappear at the surface of the silica. According to a preferable embodiment, the calcination of the silica support may be carried out at a temperature of about 100° C. to about 700° C. A moisture content of the silica support after the calcination may preferably be about 0.1 wt % to 7 wt %.

The inside of the silica support mentioned in the present disclosure includes pores. Unless there is a particular mention thereof in this disclosure, the moisture content☐of the support is defined as a percentage of a weight of moisture included in the support to a total weight of the support.

In addition, the surface of the support may include about 0.5 mmol/g to about 5 mmol/g of a hydroxy group, or preferably about 0.7 mmol/g to about 2 mmol/g of a hydroxy group, as the support has the moisture content within the above-described range.

The support may be at least one selected from the group consisting of silica, silica-alumina, and silica-magnesia, and preferably be silica. In addition to this, any support satisfying the moisture content range may be used without limitation.

Meanwhile, the method for preparing a supported hybrid metallocene catalyst according to the present disclosure includes the step of supporting at least one first metallocene compound on the silica support.

In particular, the present disclosure can prepare a polymer with excellent processability while having a broad molecular weight distribution (MWD) by supporting at least one first metallocene compound on the silica support in advance.

According to the present disclosure, since the catalytic activity is increased with high bulk density and broad molecular weight distribution through ethylene polymerization, productivity of the polyolefin may be greatly improved.

In the supported hybrid metallocene catalyst of the present disclosure, the first metallocene compound and the second metallocene compound are main components which can exhibit activity as a catalyst together with the aluminum-based cocatalyst compound.

Any metallocene compound may be used without limitation if it is conventionally used in the art as the first metallocene compound and the second metallocene compound. For example, the metallocene compound may be 1) a metallocene compound including a combination of a non-bridge Cp and a Cp type, 2) a metallocene compound including a combination of a Si bridge Cp and a Cp type, 3) a metallocene compound including a combination of a C bridge Cp and a Cp type, 4) a metallocene compound including a combination of a Si bridge Cp and an amine type, 5) a metallocene compound including a combination of an ethylene bridge Cp and a Cp type, 6) a metallocene compound including a combination of a phenylene bridge Cp and an amine type, and 7) a metallocene compound including a C—C bridge, a Si—C bridge, or a Si—Si bridge. The Cp may be cyclopentadienyl, indenyl, fluorenyl, indenoindole (InIn), and the like, and the structure is not limited. Furthermore, the Si-based bridge may include a t-butoxy-hexyl substituent or a similar structure thereof, and the indene structure may include a tetrahydro-indene structure. Furthermore, the metallocene compound of the present disclosure includes a low molecular weight metallocene compound (a Cp type) and a high molecular weight metallocene compound (for example, a CGC type or an ansa type).

More specifically, the first metallocene compound may use at least one selected from the group consisting of 1) a metallocene compound including a combination of a non-bridge Cp and a Cp type, 2) a metallocene compound including a combination of a Si bridge Cp and a Cp type, 3) a metallocene compound including a combination of a C bridge Cp and a Cp type, 5) a metallocene compound including a combination of an ethylene bridge Cp and a Cp type, and 7) a metallocene compound including a C—C bridge, a Si—C bridge, or a Si—Si bridge. In addition, the second metallocene compound may use at least one selected from the group consisting of 4) a metallocene compound including a combination of a Si bridge Cp and an amine type, and 6) a metallocene compound including a combination of a phenylene bridge Cp and an amine type.

For example, the metallocene compound may be at least selected from the group consisting of the compounds represented the following Chemical Formulae 1 to 5:

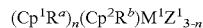  [Chemical Formula 1]

in Chemical Formula 1, $M^1$ is a group 4 transition metal;

$Cp^1$ and $Cp^2$ are the same as or different from each other, and are each independently selected from the group consisting of cyclopentadienyl, indenyl, 4,5,6,7-tetrahydro-1-indenyl, and a fluorenyl radical, and they may be substituted with a C1-C20 hydrocarbon;

$R^a$ and $R^b$ are the same as or different from each other, and are each independently hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl, provided that at least one of $R^a$ or $R^b$ is not hydrogen;

$Z^1$ are each independently a halogen, a C1-C20 alkyl, a C2-C10 alkenyl, a C7-C40 alkylaryl, a C7-C40 arylalkyl, a C6-C20 aryl, a substituted or unsubstituted C1-C20 alkylidene, a substituted or unsubstituted amino group, a C2-C20 alkylalkoxy, or a C7-C40 arylalkoxy; and n is 1 or 0;

  [Chemical Formula 2]

in Chemical Formula 2, $M^2$ is a group 4 transition metal;

$Cp^3$ and $Cp^4$ are the same as or different from each other, and are each independently selected from the group consisting of cyclopentadienyl, indenyl, 4,5,6,7-tetrahydro-1-indenyl, and a fluorenyl radical, and they may be substituted with a C1-C20 hydrocarbon;

$R^c$ and $R^d$ are the same as or different from each other, and are each independently hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl;

$Z^2$ are each independently a halogen, a C1-C20 alkyl, a C2-C10 alkenyl, a C7-C40 alkylaryl, a C7-C40 arylalkyl, a C6-C20 aryl, a substituted or unsubstituted C1-C20 alkylidene, a substituted or unsubstituted amino group, a C2-C20 alkylalkoxy, or a C7-C40 arylalkoxy;

$B^1$ is one or more, or a combination of radicals including a carbon, germanium, silicon, phosphorus, or nitrogen atom, which cross-links the $Cp^3R^c$ ring and the $Cp^4R^d$ ring or cross-links the $Cp^4R^d$ ring and $M^2$; and m is 1 or 0;

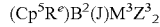 [Chemical Formula 3]

in Chemical Formula 3, $M^3$ is a group 4 transition metal;

$Cp^5$ is selected from the group consisting of cyclopentadienyl, indenyl, 4,5,6,7-tetrahydro-1-indenyl, and a fluorenyl radical, and it may be substituted with a C1-C20 hydrocarbon;

$R^e$ is hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl;

$Z^3$ are each independently a halogen, a C1-C20 alkyl, a C2-C10 alkenyl, a C7-C40 alkylaryl, a C7-C40 arylalkyl, a C6-C20 aryl, a substituted or unsubstituted C1-C20 alkylidene, a substituted or unsubstituted amino group, a C2-C20 alkylalkoxy, or a C7-C40 arylalkoxy;

$B^2$ is one or more, or a combination of radicals including a carbon, germanium, silicon, phosphorus, or nitrogen atom, which cross-links the $Cp^5R^e$ ring with J; and J is selected from the group consisting of $NR^f$, O, $PR^f$ and S, where $R^f$ are each independently a C1-C20 alkyl, an aryl, a substituted alkyl, or a substituted aryl,

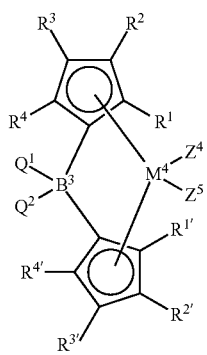 [Chemical Formula 4]

in Chemical Formula 4, $R^1$ to $R^4$ and $R^{1'}$ to $R^{4'}$ are the same as or different from each other, and are each independently hydrogen, a C1-C20 alkyl group, a C2-C20 alkenyl group, a C6-C20 aryl group, a C7-C20 alkylaryl group, a C7-C20 arylalkyl group, or a C1-C20 amine group, and two or more adjacent groups of $R^1$ to $R^4$ and $R^{1'}$ to $R^{4'}$ may be connected with each other to form one or more aliphatic rings, aromatic rings, or hetero rings;

$Q^1$ and $Q^2$ are the same as or different from each other, and are each independently hydrogen, a C1-C20 alkyl group, a C3-C20 cycloalkyl group, a C1-C20 alkoxy group, a C6-C20 aryl group, a C6-C10 aryloxy group, a C2-C20 alkenyl group, a C7-C40 alkylaryl group, or a C7-C40 arylalkyl group;

$B^3$ is a C2-C20 alkylene group, a C3-C20 cycloalkylene group, a C6-C20 arylene group, a C7-C40 alkylarylene group, or a C7-C40 arylalkylene group;

$M^4$ is a group 4 transition metal; and $Z^4$ and $Z^5$ are the same as or different from each other, and are each independently a halogen, a C1-C20 alkyl group, a C2-C10 alkenyl group, a C6-C20 aryl group, a nitro group, an amido group, a C1-C20 alkylsilyl group, a C1-C20 alkoxy group, or a C1-C20 sulfonate group;

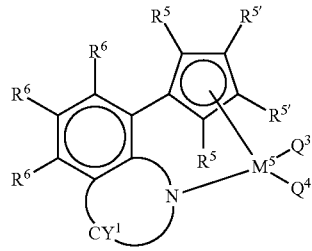 [Chemical Formula 5]

in Chemical Formula 5, $R^5$ and $R^{5\square}$ are each independently hydrogen, a C1-C20 alkyl, a C2-C20 alkenyl, a C6-C20 aryl, a C6-C20 silyl, a C7-C20 alkylaryl, a C7-C20 arylalkyl, or a metalloid of a group 4 metal substituted with a hydrocarbyl, and $R^5$ and $R^{5\square}$, or two $R^{5\square}$s may be connected with each other to form a ring by an alkylene including a C1-C20 alkyl or a C6-C20 aryl;

$R^6$ are each independently hydrogen, a halogen, a C1-C20 alkyl, a C2-C20 alkenyl, a C6-C20 aryl, a C7-C20 alkylaryl, a C7-C20 arylalkyl, a C1-C20 alkoxy, a C6-C20 aryloxy, or an amido, and two or more groups of $R^6$s may be connected with each other to form an aliphatic ring or an aromatic ring;

$CY^1$ together with N form a substituted or unsubstituted aliphatic or aromatic ring, and a substituent of $CY^1$ is a halogen, a C1-C20 alkyl, a C2-C20 alkenyl, a C6-C20 aryl, a C7-C20 alkylaryl, a C7-C20 arylalkyl, a C1-C20 alkoxy, a C6-C20 aryloxy, or an amido, wherein two or more substituents may be connected with each other to form an aliphatic ring or an aromatic ring when there are a plurality of the substituents;

$M^5$ is a group 4 transition metal; and $Q^3$ and $Q^4$ are independently a halogen, a C1-C20 alkyl, a C2-C20 alkenyl, a C6-C20 aryl, a C7-C20 alkylaryl, a C7-C20 arylalkyl, a C1-C20 alkylamido, a C6-C20 arylamido, or a C1-C20 alkylidene.

The metallocene compound including the combination of the non-bridge Cp and the Cp type may include the compound represented by the Chemical Formula 1.

The metallocene compound including the combination of the Si bridge Cp and the Cp type and the metallocene compound including the combination of the C bridge Cp and the Cp type may include the compound represented by the Chemical Formula 2. In Chemical Formula 2, the $Cp^3R^e$ ring and the $Cp^4R^d$ ring are cross-linked or the $Cp^4R^d$ ring is cross-linked with $M^2$ by a carbon, germanium, silicon, phosphorus, or nitrogen atom of $B^1$.

The metallocene compound including the combination of the Si bridge Cp and the amine type may include the compound represented by the Chemical Formula 3.

The metallocene compound including the combination of the ethylene bridge Cp and the Cp type may include the compound represented by the Chemical Formula 4. In Chemical Formula 4, the two cyclopentadienyl groups are cross-linked by a substituent having two or more carbon atoms, which is distinguished from the carbon, germanium, silicon, phosphorus, or nitrogen atom of B¹ in Chemical Formula 2. In Chemical Formula 4, the C2-C20 alkylene group, the C3-C20 cycloalkylene group, the C6-C20 arylene group, the C7-C40 alkylarylene group, or the C7-C40 arylalkylene group of B³ represents a divalent substituent in which a hydrogen atom is further removed from an alkyl group, a cycloalkyl group, an aryl group, an alkylaryl group, or an arylalkyl group.

The metallocene compound including the combination of the phenylene bridge Cp and the amine type may include the compound represented by the Chemical Formula 5.

The hydrocarbyl defined in the Chemical Formula 5 is a monovalent functional group of a hydrocarbon from which a hydrogen atom is eliminated, and includes ethyl, phenyl, and the like. Further, the metalloid is an element with properties between those of metals and nonmetals, and includes arsenic, boron, silicon, tellurium, and the like.

Specifically, in the supported hybrid metallocene catalyst of the present disclosure, the first metallocene compound may be the compound represented by the Chemical Formula 1, 2, or 4, and may preferably be the compound represented by the Chemical Formula 1. Specifically, in the supported hybrid metallocene catalyst of the present disclosure, the second metallocene compound may be the compound represented by the Chemical Formula 3, or 5, and may preferably be the compound represented by the Chemical Formula 3.

According to one example of the present disclosure, the compound represented by the Chemical Formula 1 may be a compound represented by any one of the following structural formulae, but the present invention is not limited thereto.

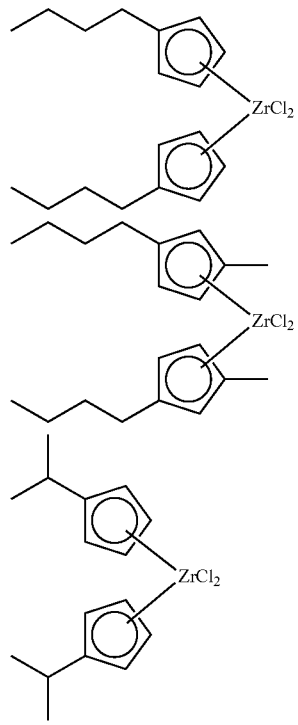

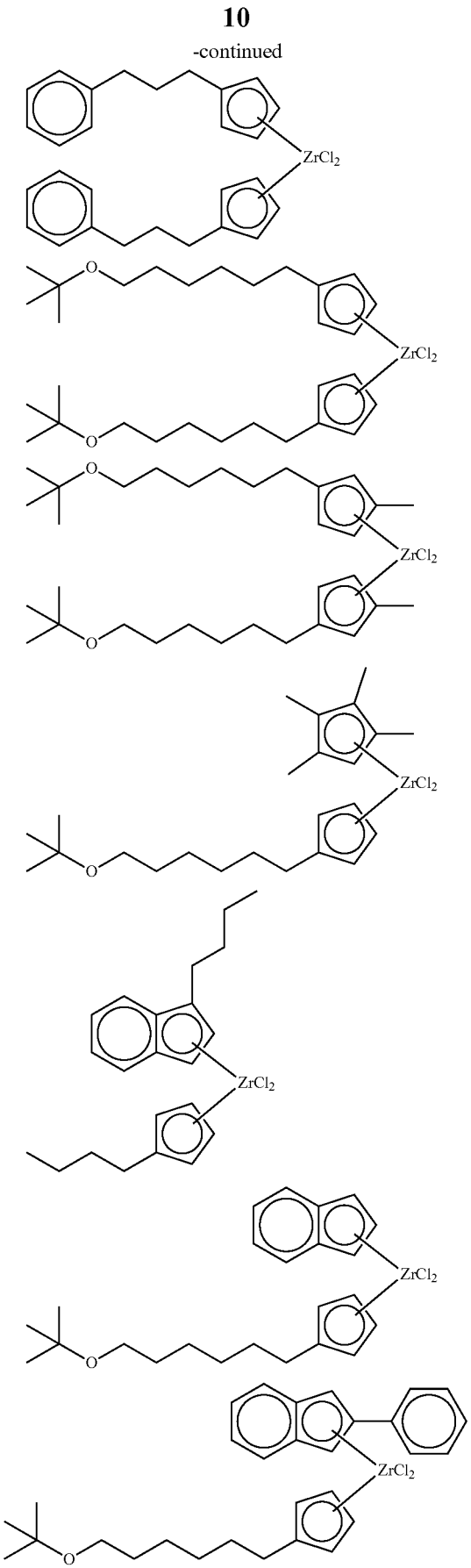

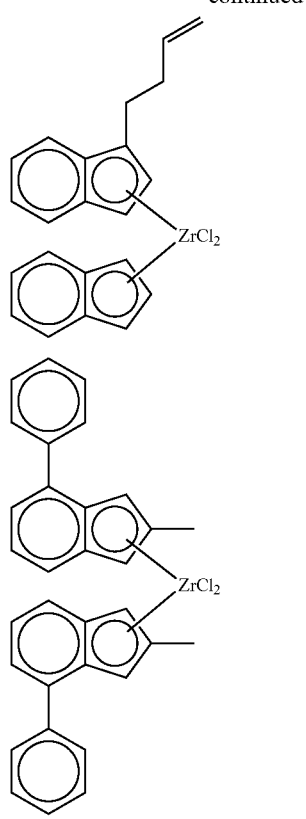
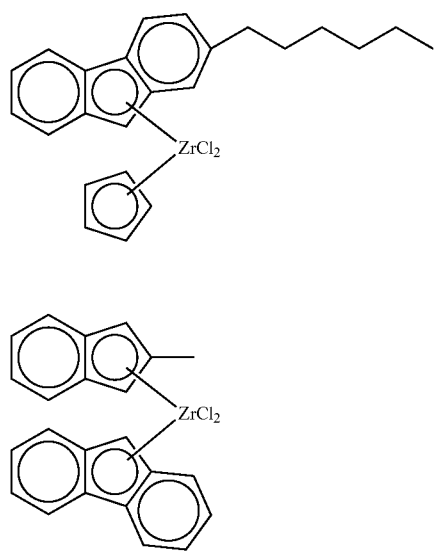
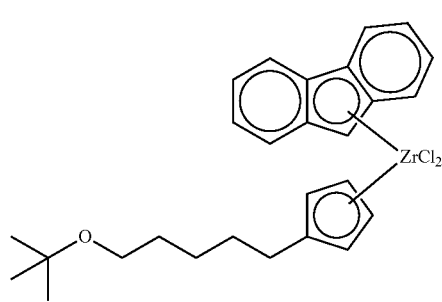
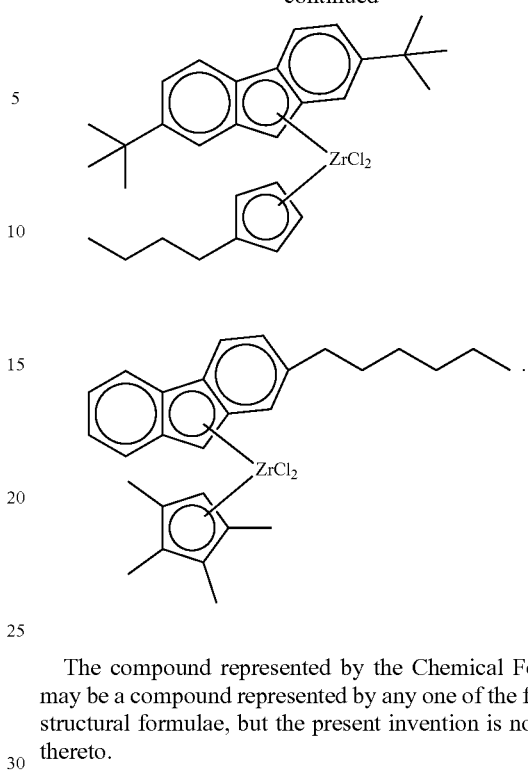
The compound represented by the Chemical Formula 2 may be a compound represented by any one of the following structural formulae, but the present invention is not limited thereto.
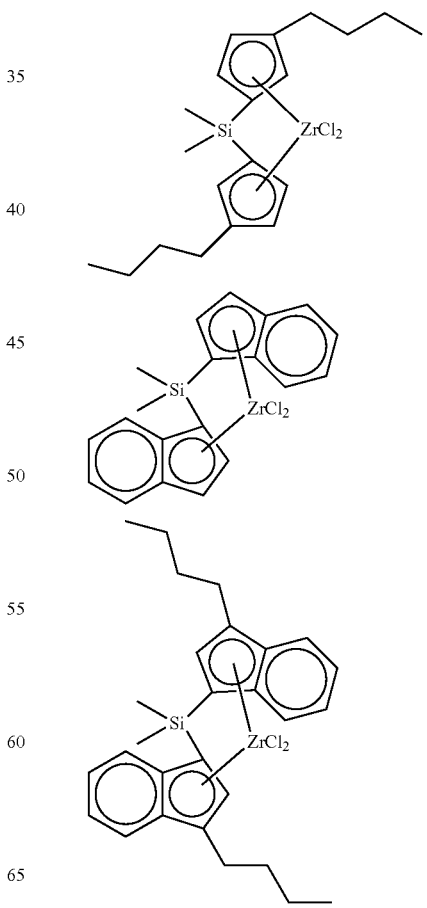

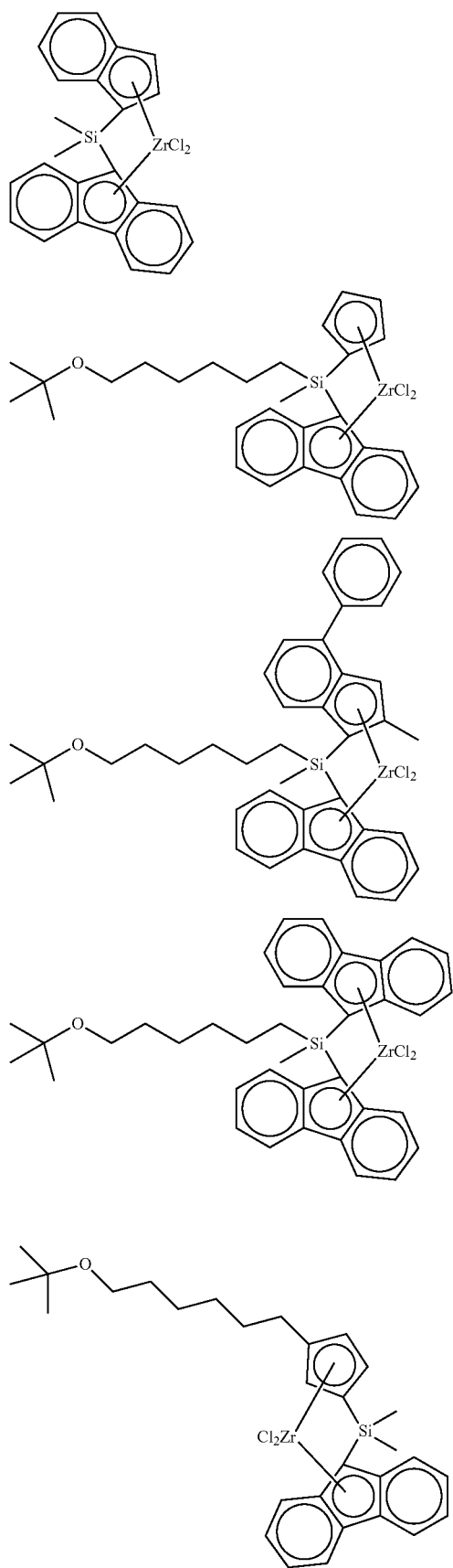
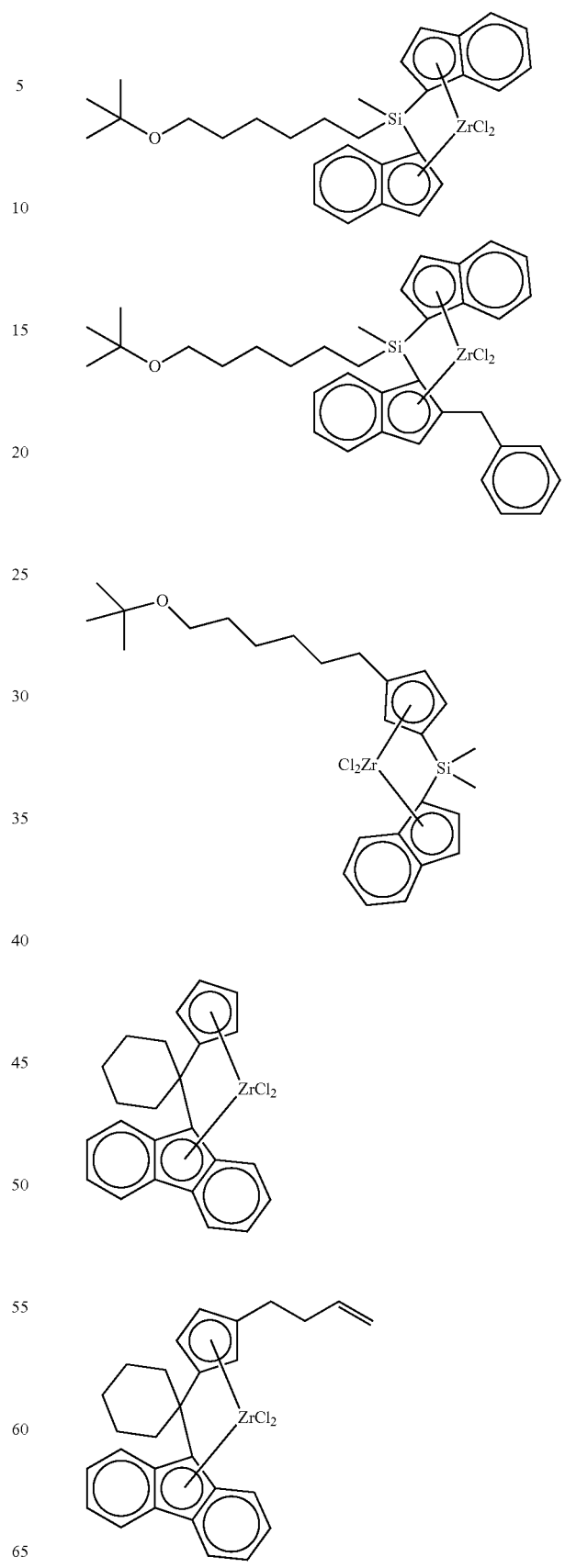

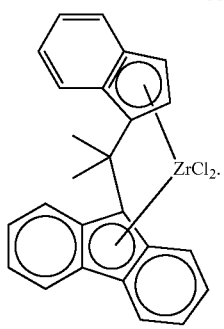
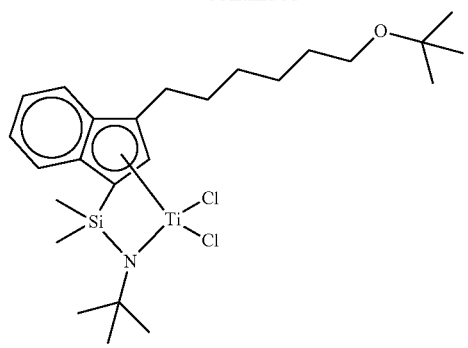
According to one example of the present disclosure, the compound represented by the Chemical Formula 3 may be a compound represented by any one of the following structural formulae, but the present invention is not limited thereto.
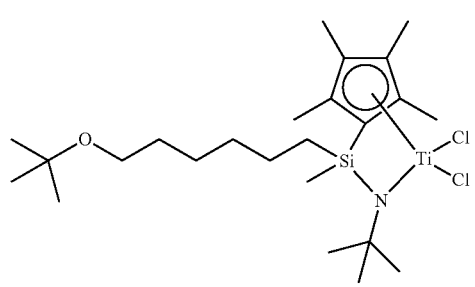
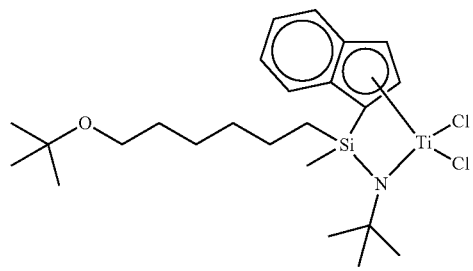
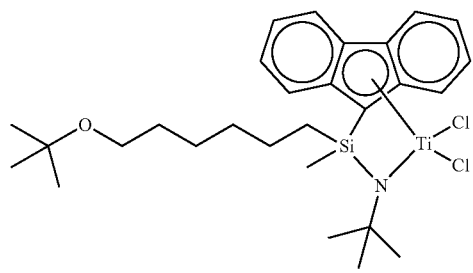
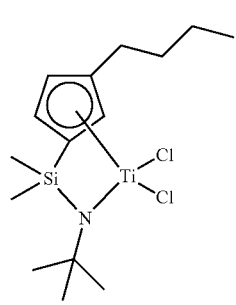

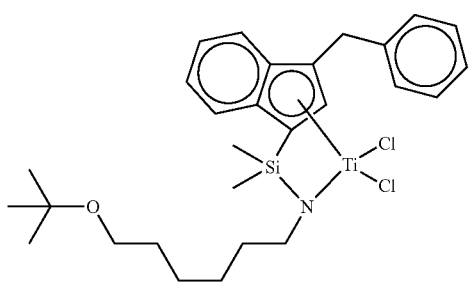

According to one example of the present disclosure, in Chemical Formula 4, $B^3$ may be a C2-C20 alkylene group, or an ethylene group, $Q^1$ and $Q^2$ may each independently be hydrogen, a C1-C20 alkyl group, or a C1-C20 alkoxy group, and $Z^4$ and $Z^5$ may each independently be a halogen, but the present invention is not limited thereto.

In addition, the compound represented by the Chemical Formula 4 may be a compound represented by any one of the following structural formulae, but the present invention is not limited thereto.

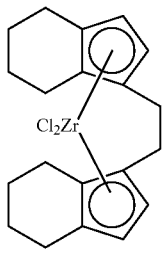

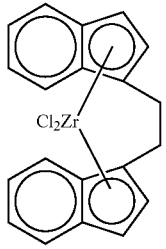

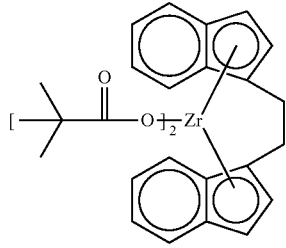

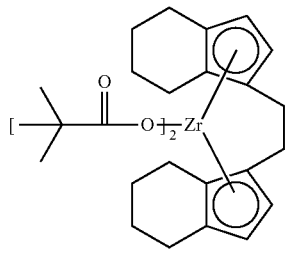

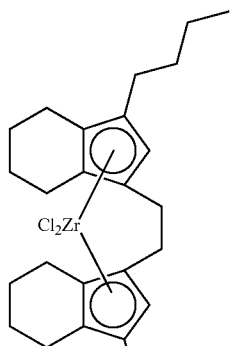

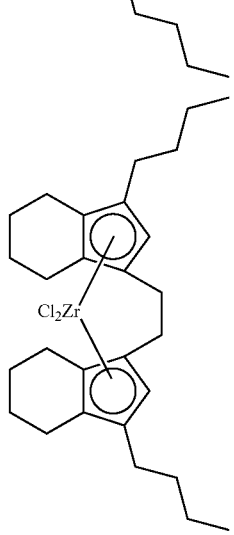

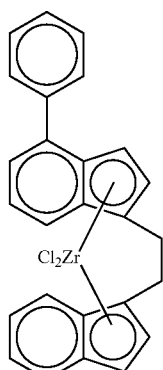

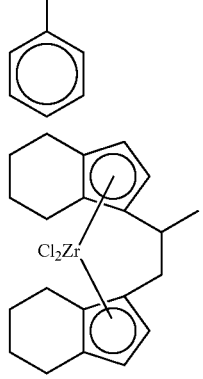

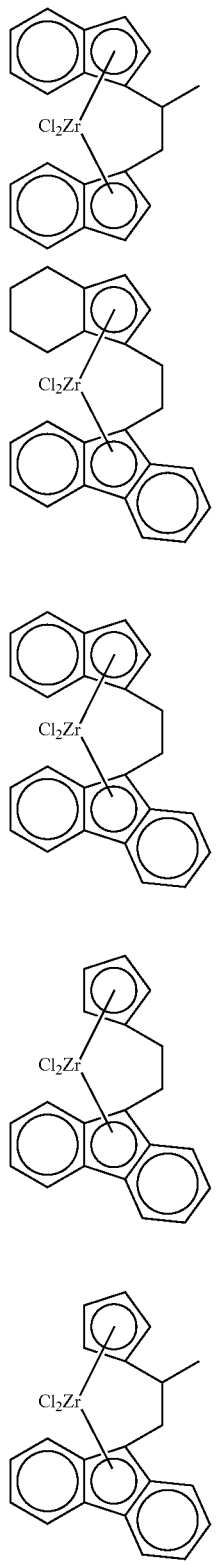
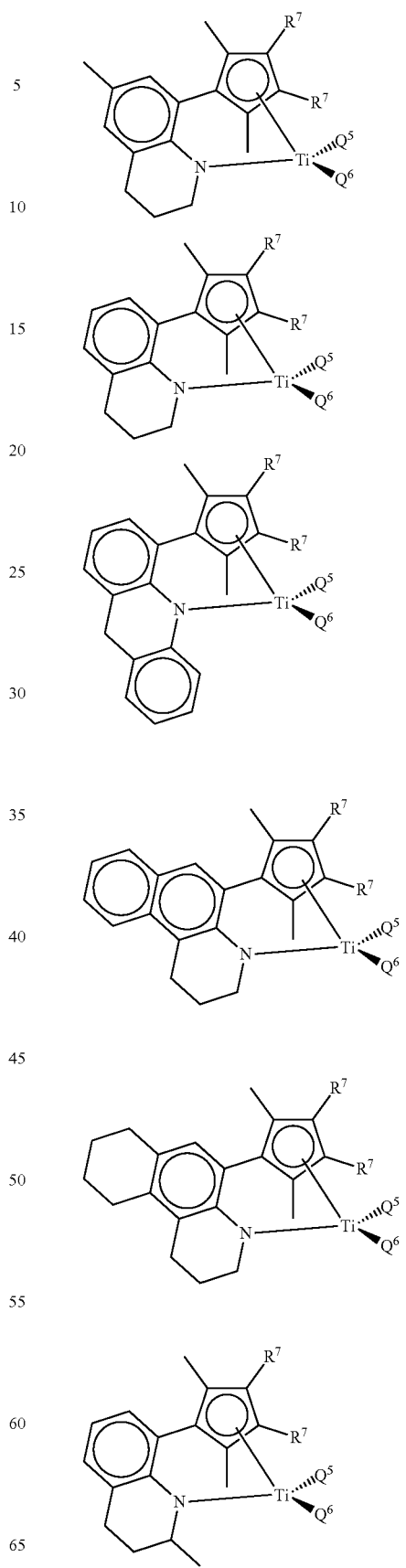
The compound represented by the Chemical Formula 5 may be a compound represented by any one of the following structural formulae, but the present invention is not limited thereto.

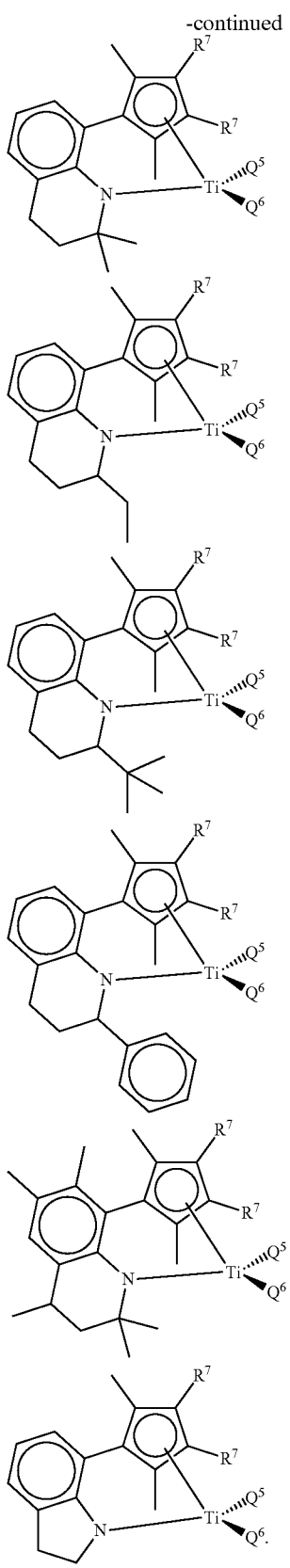

In the above structural formulae, $R^7$ are each independently hydrogen or methyl; and $Q^5$ and $Q^6$ are each independently methyl, dimethylamido or chloride.

The metallocene compound represented by the Chemical Formula 5 may structurally keep an angle of Cp-$M^5$-N narrow and an angle of $Q^3$-$M^5$-$Q^4$ wide where monomers approach, because the metal site is connected by the cyclopentadienyl ligand to which the amido group connected to the phenylene bridge in the form of a ring is introduced.

The substituents in the supported hybrid metallocene compound of the Chemical Formulae 1 to 5 will be explained in more detail as follows.

The C1-C20 alkyl group includes a linear or branched alkyl group, and specifically may be a methyl group, an ethyl group, a propyl group, an isopropyl group, an n-butyl group, a tert-butyl group, a pentyl group, a hexyl group, a heptyl group, an octyl group, or the like, but it is not limited thereto.

The C2-C20 alkenyl group includes a linear or branched alkenyl group, and specifically may be an allyl group, an ethenyl group, a propenyl group, a butenyl group, a pentenyl group, or the like, but it is not limited thereto.

The C2 to C20 alkylene group includes a linear or branched alkylene group, and specifically may be an ethylene group, a propylene group, a butylene group, a pentylene group, a hexylene group, a heptylene group, an octylene group, or the like, but it is not limited thereto.

The C3 to C20 cycloalkyl group may be a cyclopropyl group, a cyclobutyl group, a cyclopentyl group, a cyclohexyl group, a cycloheptyl group, a cyclooctyl group, or the like, but it is not limited thereto.

The C3 to C20 cycloalkylene group may be a cyclopropylene group, a cyclobutylene group, a cyclopentylene group, a cyclohexylene group, a cycloheptylene group, a cyclooctylene group, or the like, but it is not limited thereto.

The C6 to C20 aryl group includes a single ring aryl group or a condensed ring aryl group, and specifically, it may be a phenyl group, a biphenyl group, a naphthyl group, a phenanthrenyl group, a fluorenyl group, or the like, but it is not limited thereto.

The C6 to C20 arylene group includes a single ring arylene group or a condensed ring arylene group, and specifically, it may be a phenylene group, a biphenylene group, a naphthylene group, a phenanthrenylene group, a fluorenylene group, or the like, but it is not limited thereto.

The C1 to C20 alkoxy group may be a methoxy group, an ethoxy group, a phenyloxy group, a cyclohexyloxy group, or the like, but it is not limited thereto.

The C2 to C20 alkoxyalkyl group is a functional group in which at least one hydrogen of the alkyl group is substituted with an alkoxy group, and specifically, it may be an alkoxyalkyl group such as a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group, a tert-butoxyhexyl group; or an aryloxyalkyl group such as a phenoxyhexyl group, but it is not limited thereto.

The C1 to C20 alkylsilyl group or the C1 to C20 alkoxysilyl group is a functional group in which 1 to 3 hydrogens of —$SiH_3$ are substituted with 1 to 3 alkyl groups or alkoxy groups described above, and specifically, it may be an alkylsilyl group such as a methylsilyl group, a dimethylsilyl group, a trimethylsilyl group, a dimethylethylsilyl group, a diethylmethylsilyl group or a dimethylpropylsilyl group; an alkoxysilyl group such as a methoxysilyl group, a dimethoxysilyl group, a trimethoxysilyl group or a dimethoxyethoxysilyl group; or an alkoxyalkylsilyl group such as a methoxydimethylsilyl group, a diethoxymethylsilyl group or a dimethoxypropylsilyl group, but it is not limited thereto.

The C1 to C20 silylalkyl group is a functional group in which at least one hydrogen of the alkyl group is substituted with a silyl group, and specifically, it may be —CH$_2$—SiH$_3$, a methylsilylmethyl group or a dimethylethoxysilylpropyl group, or the like, but it is not limited thereto.

The halogen may be fluorine (F), chlorine (Cl), bromine (Br) or iodine (I).

The sulfonate group has a structure of —O—SO$_2$—R☐, wherein R☐ may be a C1 to C20 hydrocarbyl group. Specifically, the C1 to C20 sulfonate group may include a methanesulfonate group, a phenylsulfonate group, or the like, but it is not limited thereto.

The ester group has a structure of —O—CO—R", wherein R" may be a C1 to C19 alkyl group. The ester group is a substituent in which a hydrogen atom is removed from a C2 to C20 carboxylic acid. Specifically, the C2 to C20 ester group may include a formate group, an acetate group, a propionate group, a pivalate group, and the like, but it is not limited thereto.

The above-mentioned substituents may be optionally substituted with one or more substituents selected from the group consisting of a hydroxyl group; a halogen; an alkyl or alkenyl, aryl, alkoxy group; an alkyl or alkenyl, aryl, alkoxy group containing at least one heteroatom of Group 14 to 16 heteroatoms; a silyl group; an alkylsilyl or alkoxysilyl group; a phosphine group; a phosphide group; a sulfonate group; and a sulfone group.

The Group 4 transition metal may be titanium (Ti), zirconium (Zr), hafnium (Hf), or the like, but it is not limited thereto.

According to one embodiment of the present disclosure, the metallocene compound may be synthesized by applying known reactions. Specifically, the metallocene compound may be prepared by preparing each ligand compound and then performing metallation with a metal precursor compound. However, the present disclosure is not limited thereto, and the synthesis method can be referred to Examples.

Meanwhile, the present disclosure is characterized in that after at least one first metallocene compound is supported on the silica support, the aluminum-based cocatalyst compound is divided and added thereto at high temperatures.

The above step of supporting the first metallocene compound may be performed by reacting the silica support and the metallocene compound while mixing and stirring in the presence of a solvent.

At this time, an amount of the first metallocene compound supported on the silica support in the above step may be about 0.01 mmol/g to about 1 mmol/g, or about 0.1 mmol/g to about 1 mmol/g based on 1 g of the silica support. That is, it is preferable that the amount is within the above range in consideration of a contribution effect of the first metallocene compound on catalytic activity.

The temperature condition is not particularly limited in the step of supporting the first metallocene compound.

Thereafter, the method for preparing a supported hybrid metallocene catalyst of the present disclosure includes the step of sequentially supporting the aluminum-based cocatalyst compound on the silica support by contacting the silica support on which the first metallocene compound is supported with at least one aluminum-based cocatalyst compound.

In particular, the present disclosure is characterized in supporting the aluminum-based cocatalyst compound dividedly on the silica support on which the first metallocene compound is supported at different temperatures while varying the temperature from high (about 100° C. to about 150° C.) to low (about −5° C. to about 40° C.).

That is, the aluminum-based cocatalyst is supported on the silica support by a separate-input method in which a part of a whole input is primarily added at a high temperature of about 100° C. to about 150° C., and the rest of the whole input is secondarily added at a low temperature of about −5° C. to about 40° C. Specifically, the high temperature may include a range of about 110° C. to about 130° C., and the low temperature may include a range of about 0° C. to about 40° C.

Therefore, according to one preferred embodiment of the present disclosure, the aluminum-based cocatalyst compound is supported on the silica support by a separate-input method in which a part, about 50 wt % to about 90 wt %, or about 60 wt % to about 90 wt %, of a whole input is primarily added at a temperature of about 100° C. to about 150° C., or about 110° C. to about 130° C., and the rest, about 50 wt % to about 10 wt %, or about 40 wt % to about 10 wt %, of the whole input is secondarily added at a temperature of about −5° C. to about 40° C., or about 0° C. to about 40° C.

In addition, according to one preferred embodiment of the present disclosure, the silica support on which the aluminum-based cocatalyst compound is supported may be obtained by the method of primarily supporting about 60 wt % to about 90 wt % of the whole input of alkylaluminoxane on the silica support and performing a former reaction at about 110° C. to about 130° C., and secondarily supporting the rest, about 40 wt % to about 10 wt %, of the alkylaluminoxane on the silica support and performing a latter reaction at about 0° C. to 40° C.

More specifically, the present disclosure brings the silica support on which the first metallocene compound is supported obtained in above step into contact with the aluminum-based cocatalyst compound, the cocatalyst. The present disclosure makes more aluminum-based cocatalyst compounds penetrate into the silica support than the prior art, and makes a substantial amount of the aluminum-based cocatalyst compound supported on the surface by dividedly adding the aluminum-based cocatalyst compound to the silica support twice. According to this method, there is provided the silica support composed of an inner layer and an outer layer surrounding the inner layer of the silica support on which the aluminum-based cocatalyst compound is supported on its inside and surface.

The present disclosure is characterized in that the alkylaluminoxane and the silica support come in contact with each other at a higher temperature where chemical attachment is predominant and the reactant decreases in viscosity and is easily diffused into pores inside the silica in advance, and the alkylaluminoxane comes in contact with the silica at a lower temperature so that the cocatalyst component is physically adsorbed and supported onto the surface of the silica, thereby increasing the content of the cocatalyst in the silica. Therefore, in the present disclosure, the bulk density of the polymer and the catalytic activity may be controlled not only by the amount of the alkylaluminoxane and the contact temperature but also by the addition method.

In the process of supporting the alkylaluminoxane, as disclosed above, a method of dividedly adding the alkylaluminoxane at a higher temperature and at a lower temperature at least twice or more is used. For example, the aluminum-based cocatalyst compound may be dividedly added twice. In the first adding process, the former reaction may be performed in a range of a minimum temperature of about 100° C., or about 110° C. to a maximum temperature of about 150° C., or about 130° C. In the second adding process process, the latter reaction may performed in a temperature range of about −5° C., or about 0° C. to about 40° C. while dividedly adding and supporting the alkylaluminoxane. Furthermore, about 50 wt % to about 90 wt %, or about 60 wt % to about 90 wt % of the whole input of the alkylaluminoxane is supported in the first adding process, and the rest is supported in the second adding process.

At this time, if the aluminum-based cocatalyst compound is not dividedly added but is added at once, the aluminum-based cocatalyst compound is unevenly supported on the support and aluminum excessively exists on the surface of the support. In contrast, the metallocene compound with a small molecular size is evenly supported on the inside and outside of the support. Therefore, if the aluminum-based cocatalyst compound is added at once, a total catalytic activity decreases because the metallocene compound supported on the inside is not activated, and accordingly, there is a problem of the decrease in bulk density because the polymerization is carried out by the catalyst activated only on the outside.

In particular, when the cocatalyst is dividedly added as described above, the first adding process is performed at a high temperature of a minimum temperature of about 100° C. or about 110° C. to significantly increase the amount of the cocatalyst supported in the final catalyst compared to the input. In other words, as described above, even when the supporting process is performed using the same amount of cocatalyst, the amount of the cocatalyst actually supported on the catalyst is much higher and a supporting efficiency is higher by dividing and supporting the cocatalyst at a high temperature.

Meanwhile, the alkylaluminoxane is a cocatalyst for assisting the activity of the first and second metallocene compounds disclosed above.

The above step may be performed by mixing and reacting the silica support and the alkylaluminoxane in the presence or absence of a solvent while stirring.

Herein, the aluminum-based cocatalyst compound may be represented by the following Chemical Formula 6:

[Chemical Formula 6]

in Chemical Formula 6, $R^8$, $R^9$, and $R^{19}$ are the same as or different from each other, and are each independently hydrogen, a halogen, a C1 to C20 hydrocarbyl group, or a C1 to C20 hydrocarbyl group substituted with a halogen;

l is 0 or 1; and x is an integer of 2 or more.

The aluminum-based cocatalyst compound of the Chemical Formula 6 may be an alkylaluminoxane-based compound including repeating units bonded in a linear, circular or network shape, and may be a trialkylaluminum compound. In addition, the alkyl group bonded to aluminum in the aluminum-based cocatalyst compound may have 1 to 20 carbon atoms, or 1 to 10 carbon atoms. Specifically, the aluminum-based cocatalyst compound may be an alkylaluminoxane-based compound selected from the group consisting of methyl aluminoxane (MAO), ethyl aluminoxane, isobutyl aluminoxane and butyl aluminoxane; or a trialkylaluminum compound selected from the group consisting of trimethylaluminum, triethylaluminum (TEAL), triisobutylaluminum, trihexylaluminum, trioctylaluminum and isoprenylaluminum.

The amount of the aluminum-based cocatalyst compound supported on the silica support in above step may be about 5 mmol/g to about 15 mmol/g, or about 8 mmol/g to about 13 mmol/g based on 1 g of the silica support. That is, the former reaction and the latter reaction of the aluminum-based cocatalyst compound may be performed while dividedly supporting the aluminum-based cocatalyst compound at a higher temperature and at a lower temperature within the above supporting amount.

At this time, a solvent may be used in the above step for inducing a smooth contact reaction between the support and the aluminum-based cocatalyst compound, but the reaction may also be performed without the solvent.

Most organic solvents such as an aliphatic hydrocarbon like hexane, pentane, and heptane; an aromatic hydrocarbon like toluene and benzene; a chlorinated hydrocarbon like dichloromethane; an ether like diethylether and tetrahydrofuran (THF); acetone; ethylacetate; and the like may be used as the solvent. Preferably, hexane, heptane, toluene, or dichloromethane may be used as the solvent.

By the above process, the present disclosure can provide a silica support in which a greater amount of the aluminum-based cocatalyst compound penetrates into the inside of the silica support, and a considerable amount of the aluminum-based cocatalyst compound is bound to the outside of the silica support.

Meanwhile, the method for preparing a supported hybrid metallocene catalyst according to the present disclosure includes the step of supporting at least one second metallocene compound on the silica support on which the aluminum-based cocatalyst is supported.

In the present disclosure, at least one second metallocene compound is supported on the silica support on which the first metallocene compound and the aluminum-based cocatalyst compound are dividedly supported as described above, thereby optimizing an interaction with the cocatalyst already supported depending on the reaction condition of each metallocene compound for controlling catalytic characteristics. It can be confirmed that the amount of the aluminum-based cocatalyst compound supported on the inside and outside of the silica in the supported metallocene catalyst prepared by above method is controlled by analyzing a depth profile of the catalyst support with a SEM/EDS analysis method.

The second metallocene compound may be at least one selected from the group consisting of Chemical Formulae 1 to 5 as described above.

The above step may be performed by reacting the support and the second metallocene compound while mixing and stirring in the presence of a solvent.

At this time, an amount of the second metallocene compound supported on the silica support in the above step may be about 0.01 to about 1 mmol/g, or about 0.1 mmol/g to about 1 mmol/g based on 1 g of the silica support. That is, it is preferable that the amount is within the above range in consideration of a contribution effect of the metallocene compound on catalytic activity.

The temperature condition is not particularly limited in the step of supporting the second metallocene compound.

Meanwhile, the method for preparing a supported hybrid metallocene catalyst of the present disclosure may effectively prepare a polyolefin having a broad molecular weight distribution with bulk density by supporting an aluminum-based cocatalyst compound by contacting the silica support on which the first metallocene compound is supported with at least one aluminum-based cocatalyst compound, and sequentially supporting the second metallocene compound.

In particular, a mixing molar ratio of the first metallocene compound and the second metallocene compound may be about 1:0.5 to about 1:2.5 or about 1:1 to about 1:1.5.

Meanwhile, the present disclosure may further support a borate-based compound as a second cocatalyst. That is, the present disclosure may further include a step of supporting a borate-based compound as a second cocatalyst on the silica support on which at least one first metallocene compound, the aluminum-based cocatalyst compound, and at least one second metallocene compound are supported.

Therefore, according to one embodiment of the present disclosure, at least one first metallocene compound and an aluminum-based cocatalyst compound as a first cocatalyst may be supported on the support, a borate compound may be supported thereon as a second cocatalyst, and then at least one second metallocene compound may be supported thereon. Alternatively, according to another embodiment of the present disclosure, at least one first metallocene compound and an aluminum-based cocatalyst compound as a first cocatalyst may be supported on the support, at least one second metallocene compound may be supported thereon, and then a borate compound may be supported thereon as a second cocatalyst. When the second cocatalyst is included in the supported metallocene catalyst, a polymerization activity of the final catalyst to be prepared may be improved.

The borate-based compound of the second cocatalyst may include a borate-based compound in the form of trisubstituted ammonium salts, dialkyl ammonium salts, or trisubstituted phosphonium salts. Specific examples of the second cocatalyst may include a borate-based compound in the form of tri-substituted ammonium salts selected from the group consisting of trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecycloctadecylammonium tetraphenylborate, N, N-dimethylanilinium tetraphenylborate, N, N-diethylanilinium tetraphenylborate, N, N-dimethyl(2,4,6-trimethylanilinium)tetraphenylborate, trimethylammonium tetrakis (pentafluorophenyl)borate, methylditetradecylammonium tetrakis(pentafluorophenyl)borate, methyldioctadecylammonium tetrakis(pentafluorophenyl)borate, triethylammonium tetrakis(pentafluorophenyl)borate, tripropylammonium tetrakis(pentafluorophenyl)borate, tri(n-butyl) ammonium tetrakis(pentafluorophenyl)borate, tri(sec-butyl) ammonium tetrakis(pentafluorophenyl)borate, N, N-dimethylanilinium tetrakis(pentafluorophenyl)borate, N, N-diethylanilinium tetrakis(pentafluorophenyl)borate, N, N-dimethyl(2,4,6-trimethylanilinium)tetrakis(pentafluorophenyl)borate, trimethylammonium tetrakis (2,3,4,6-tetrafluorophenyl)borate, triethylammonium tetrakis (2,3,4,6-tetrafluorophenyl)borate, tripropylammonium tetrakis (2,3,4,6-tetrafluorophenyl)borate, tri(n-butyl)ammonium tetrakis (2,3,4,6-tetrafluorophenyl)borate, N,N-dimethylanilinium tetrakis(2,3,4,6-tetrafluorophenyl)borate, N, N-diethylanilinium tetrakis(2,3,4,6-tetrafluorophenyl)borate and N,N-dimethyl-(2,4,6-trimethylanilinium)tetrakis(2,3,4,6-tetrafluorophenyl)borate; a borate-based compound in the form of dialkyl ammonium salts selected from the group consisting of dioctadecyl ammonium tetrakis(pentafluorophenyl) borate, ditetradecylammonium tetrakis(pentafluorophenyl) borate and dicyclohexylammonium tetrakis (pentafluorophenyl)borate; or a borate-based compound in the form of tri-substituted phosphonium salts selected from the group consisting of triphenylphosphonium tetrakis(pentafluorophenyl)borate, methyldioctadecylphosphonium tetrakis(pentafluorophenyl)borate and tri(2,6-dimethylphenyl) phosphonium tetrakis(pentafluorophenyl)borate.

In addition, the borate-based compound may be supported in an amount of about 0.01 mmol/g to about 1 mmol/g based on 1 g of the silica support. Further, when the borate-based compound is used as the second cocatalyst in the present disclosure, a supporting order is not particularly limited. For example, the borate-based compound may be finally supported on the silica support after supporting at least one second metallocene compound on the same. Alternatively, the present disclosure may be carried by supporting the aluminum-based cocatalyst compound on the silica support, supporting the borate-based compound, and then sequentially supporting at least one metallocene compound.

In addition, according to another embodiment of the present disclosure, there is provided a method for preparing a polyolefin including the step of polymerizing olefinic monomers in the presence of the supported metallocene catalyst.

The method for preparing a polyolefin may include the steps of preparing the supported hybrid metallocene catalyst; and polymerizing olefinic monomers in the presence of the supported hybrid metallocene catalyst.

The supported metallocene catalyst according to the present disclosure may be used for a polymerization reaction by itself. Alternatively, the supported metallocene catalyst may be used in the form of a preliminarily polymerized catalyst prepared by a contact reaction with the olefinic monomer. For example, a preliminarily polymerized catalyst prepared by bringing the catalyst into contact with the olefinic monomer such as ethylene, propylene, 1-butene, 1-hexene, 1-octene, and the like may be used.

The supported metallocene catalyst may be injected into the reactor in the form of being diluted in a C5 to C12 aliphatic hydrocarbon solvent (for example, pentane, hexane, heptane, nonane, decane, and isomers thereof), an aromatic hydrocarbon solvent such as toluene and benzene, or a chlorinated hydrocarbon solvent such as dichloromethane and chlorobenzene. At this time, it is preferable to use the solvent after removing a small amount of water or air, which can act as a catalyst poison, by adding a small amount of alkylaluminum.

The polymerization reaction may be carried out using a continuous slurry polymerization reactor, a loop slurry reactor, a gas phase reactor, or a solution reactor.

And the reaction may be a homopolymerization of an olefin-based monomer or copolymerization of two or more monomers.

The polymerization of olefinic monomers may be carried out at a temperature of about 25° C. to about 500° C. and a pressure of about 1 kgf/cm$^2$ to about 100 kgf/cm$^2$ for about 1 to about 24 hours. Specifically, the polymerization of olefinic monomers may be carried out at a temperature of about 25° C. to about 500° C., preferably about 25° C. to about 200° C., more preferably about 50° C. to about 100° C. And, the polymerization of olefinic monomers may be carried out at a pressure of 1 kgf/cm$^2$ to about 100 kgf/cm$^2$, preferably about 1 kgf/cm$^2$ to about 50 kgf/cm$^2$, more preferably about 5 kgf/cm$^2$ to about 40 kgf/cm$^2$.

The olefinic monomer may be selected according to the kind of the polyolefin to be prepared, and it is preferable to use at least one olefinic monomer selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 21,6-hexadiene, styrene, alpha-methylstyrene, divinylbenzene, and 3-chloromethylstyrene.

Specifically, the polyolefin may be polyethylene which is an ethylene homopolymer, or may be a binary copolymer of ethylene-1-hexene.

The polyolefin prepared by the above method has a high bulk density, a broad molecular weight distribution and an improved settling efficiency while maintaining a high activity equal to or higher than that of the prior art.

Specifically, the polyolefin may have a bulk density of about 0.38 g/mL or more or about 0.38 g/mL to about 0.8 g/mL, or about 0.4 g/mL or more or about 0.4 g/mL to 0.8 g/mL. In particular, when the polymerization reaction is performed by applying the supported hybrid catalyst to a loop slurry reactor, the polyolefin may have a bulk density of about 0.47 g/mL or more or about 0.47 g/mL to about 0.8 g/mL, or about 0.49 g/mL or more or about 0.49 g/mL to 0.8 g/mL.

The bulk density of the polyolefin may vary depending on the density, particle size, and particle size distribution of the polyolefin. The larger the particle size distribution, the higher the bulk density. However, the larger the particle size distribution, the larger the amount of small particles (fine powders), and the fine powders do not settle well in the solvent during polymerization, thereby lowering the settling efficiency. Therefore, when comparing the bulk density of the polyolefin, the particle size distribution should also be considered, rather than just considering the absolute value of the bulk density. In addition, when the particle size distribution is narrow, that is, when the particle size is uniform, the bulk density of the polyolefin may become lower as the particle size becomes larger. However, the supported hybrid catalyst of the present disclosure has the advantage that the bulk density is rather increased while the particle size of the polymer prepared is large and the distribution is narrow even though the activity is equal to or more than the prior art. This means that the particles of the resulting polymer are densely prepared. This improves the settling efficiency when copolymerizing polymers of the same density in actual continuous processes, resulting in an increase of ethylene consumption per hour (polymer production) by at least about 15%, at least about 17.5%, or at least about 20%. Thus, the overall productivity may be increased.

Specifically, in the particle size distribution analysis of the polyolefin, a content of fine powder having a particle size of 180 micometers (μm) or less may be less than about 0.1 wt %, preferably about 0.01 wt % or less based on a total weight of the polyolefin. Alternatively, there may be no fine powder. In addition, a content of polyolefin having a particle size of 300 micometers (μm) or less may be about 1.2 wt % or less or about 0 to 1.2 wt %, or about 1.0 wt % or less or about 0.2 wt % to 1.0 wt %. In addition, a content of polyolefin having a particle size of more than 300 micrometers (μm) and 500 micrometers (μm) or less may be about 12 wt % to 19.2 wt %, or about 16 wt % to 18.5 wt %. In addition, a content of polyolefin having a particle size of more than 500 μm may be about 75 wt % or more, or about 80 wt % or more. In addition, a content of polyolefin having a particle size of more than 850 μm may be about 20 wt % or more, or about 25 wt % or more. In particular, a sum of the contents of the respective particle sizes in the particle size distribution of the polyolefin can not exceed 100 wt %. The particle size distribution analysis of the polyethylene may be measured using a sieve which can separate the polymer by a particle size, and a specific measuring method is as described in the ethylene homopolymerization described below.

For example, the polyolefin may have a particle size distribution as follows: a content of fine powder having a particle size of 180 μm or less is 0, a content of polyolefin having a particle size of more than 180 μm and 300 μm or less is about 0.4 wt % to about 0.9 wt %, a content of polyolefin having a particle size of more than 300 μm and 500 μm or less is about 16.2 wt % to about 18.1 wt %, a content of polyolefin having a particle size of more than 500 μm and 850 μm or less is about 49.0 wt % to about 55.0 wt %, and a content of polyolefin having a particle size of more than 850 μm is about 27.9 wt % to about 32.3 wt %.

For example, the bulk density (BD) of the polyolefin may be measured in accordance with ASTM D 1895 Method A. Specifically, the bulk density (BD) of the polyolefin may be determined by filling a polyolefin in a 100 mL container (for example, a SUS container) and measuring a weight (g) of the polyolefin, thereby obtaining a weight per unit volume (g/mL).

Meanwhile, the polyolefin may have a broad molecular weight distribution with the high bulk density and an optimized particle size distribution as described above.

Specifically, the polyolefin may have a molecular weight distribution (Mw/Mn) of about 4.0 or more or about 4.0 to about 8.0, or about 4.2 or more or about 4.2 to about 7.0.

For example, the molecular weight distribution (MWD, polydispersity index) may be measured using gel permeation chromatography (GPC, manufactured by Water). The MWD may be determined by measuring a weight average molecular weight (Mw) and a number average molecular weight (Mn), and then dividing the weight average molecular weight by the number average molecular weight.

Specifically, PL-GPC220 manufactured by Waters may be used as the gel permeation chromatography (GPC) instrument, and a Polymer Laboratories PLgel MIX-B 300 mm length column may be used. An evaluation temperature may be 160° C., and 1,2,4-trichlorobenzene may be used for a solvent at a flow rate of 1 mL/min. Each polyethylene sample may be pretreated by dissolving in 1,2,4-trichlorobenzene containing 0.0125% of BHT for 10 hours using a GPC analyzer (PL-GP220), and the sample with a concentration of 10 mg/10 mL may be supplied in an amount of 200 microliters (μL). Mw and Mn may be obtained using a calibration curve formed using a polystyrene standard. 9 kinds of the polystyrene standard are used with the molecular weight (g/mol) of 2000/10000/30000/70000/200000/700000/2000000/4000000/10000000.

The polyolefin may have a weight average molecular weight of about 50000 g/mol to about 250000 g/mol.

The polyolefin may also have a density of about 0.920 g/cm$^3$ to about 0.950 g/cm$^3$, preferably about 0.930 g/cm$^3$ to about 0.940 g/cm$^3$ as measured in accordance with ASTM 1505.

In addition, the polyolefin may have a settling efficiency of about 65% to about 80%, or about 67% to about 80%, which is defined by the following Equation 1 below.

Settling efficiency(%)=amount of ethylene used/
(amount of ethylene used+solvent content)×100.   [Equation 1]

Meanwhile, the supported hybrid catalyst according to the present disclosure may not only prepare a polyolefin with improved high bulk density, broad molecular weight distribution, and settling efficiency as described above, but also maintain a high catalytic activity.

Specifically, the catalytic activity in the polyolefin polymerization process may be measured by dividing a weight (kg) of the polyethylene prepared through the polymerization process by a weight (g) of the supported catalyst used in the polymerization process. The catalytic activity may be about 10 kg(polyolefin)/g(catalyst) or more or about 10 kg(polyolefin)/g(catalyst) to about 25 kg(polyolefin)/g(catalyst), or about 10.8 kg(polyolefin)/g(catalyst) or more or about 10.8 kg(polyolefin)/g(catalyst) to about 23 kg(polyolefin)/g(catalyst). In particular, when the polymerization reaction is performed by applying the supported hybrid catalyst to a loop slurry reactor, the catalytic activity may be about 11 kg(polyolefin)/g(catalyst) or more or about 11 kg(polyolefin)/g(catalyst) to about 25 kg(polyolefin)/g(catalyst), or about 11.5 kg(polyolefin)/g(catalyst) or more or about 11.5 kg(polyolefin)/g(catalyst) to about 23 kg(polyolefin)/g(catalyst). A measuring method of the catalytic activity is as described in the ethylene homopolymerization described below, and a specific measuring method is omitted.

Advantageous Effects

According to the present disclosure, a supporting rate of a cocatalyst in the supported catalyst is improved and high catalytic activity is maintained, so that the present disclosure can effectively prepare a polyolefin with improved processability which exhibits increased molecular weight distribution while having high morphology (reduced fine powder), high bulk density and improved settling efficiency.

DETAILED DESCRIPTION OF THE EMBODIMENTS

The present invention will be described in more detail with reference to the following examples. However, these examples are for illustrative purposes only, and the invention is not intended to be limited by these examples.

EXAMPLES

Synthesis Examples of Metallocene Compound

Synthesis Example 1: First Metallocene Compound t-Butyl-O—$(CH_2)_6$—Cl was prepared by the method shown in Tetrahedron Lett. 2951 (1988) using 6-chlorohexanol, and reacted with NaCp to obtain t-Butyl-O—$(CH_2)_6$—$C_5H_5$ (yield 60%, b.p. 80° C./0.1 mmHg).

Further, t-Butyl-O—$(CH_2)_6$—$C_5H_5$ was dissolved in THF at −78° C., and normal butyllithium (n-BuLi) was slowly added thereto. Thereafter, it was heated to room temperature and reacted for 8 hours. The lithium salt solution synthesized as described above was slowly added to a suspension solution of $ZrCl_4(THF)_2$ (1.70 g, 4.50 mmol)/THF (30 mL) at −78° C., and further reacted for about 6 hours at room temperature.

All volatiles were dried in vacuum and the resulting oily liquid material was filtered by adding a hexane solvent. The filtered solution was dried in vacuum, and hexane was added to obtain a precipitate at a low temperature (−20° C.). The obtained precipitate was filtered at a low temperature to obtain bis(3-(6-(tert-butoxy)hexyl)cyclopenta-2,4-dien-1-yl)-zirconiumdichloride ([tBu-O—$(CH_2)_6$—$C_5H_4$]$_2$$ZrCl_2$) in the form of a white solid (yield 92%).

$^1$H NMR (300 MHz, $CDCl_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C NMR ($CDCl_3$): 135.09, 116.66, 112.28, 72.42, 61.52, 30.66, 30.61, 30.14, 29.18, 27.58, 26.00.

Synthesis Example 2: Second Metallocene Compound 50 g of Mg (s) was added to a 10 L reactor at room temperature, followed by 300 mL of THF. 0.5 g of $I_2$ was added, and the reactor temperature was maintained at 50° C.

After the reactor temperature was stabilized, 250 g of 6-t-butoxyhexyl chloride was added to the reactor at a rate of 5 mL/min using a feeding pump. As the 6-t-butoxyhexyl chloride was added, it was observed that the temperature of the reactor was elevated by about 4° C. to 5° C. It was stirred for 12 hours while continuously adding 6-t-butoxyhexyl chloride. After the reaction for 12 hours, a black reaction solution was produced. 2 mL of the black solution was taken to which water was added to obtain an organic layer. The organic layer was confirmed to be 6-t-butoxyhexane through $^1$H-NMR. It could be seen from the above 6-t-butoxyhexane that Grignard reaction was well performed. Consequently, 6-t-buthoxyhexyl magnesium chloride was synthesized.

500 g of $MeSiCl_3$ and 1 L of THF were introduced to a reactor, and then the reactor temperature was cooled down to −20° C. 560 g of the 6-t-butoxyhexyl magnesium chloride synthesized above was added to the reactor at a rate of 5 mL/min using a feeding pump. After completion of the feeding of Grignard reagent, the mixture was stirred for 12 hours while slowly raising the reactor temperature to room temperature. After the reaction for 12 hours, it was confirmed that white $MgCl_2$ salt was produced. 4 L of hexane was added thereto and the salt was removed through a labdori to obtain a filtered solution. After the filtered solution was added to the reactor, hexane was removed at 70° C. to obtain a pale yellow liquid. The obtained liquid was confirmed to be the desired compound, methyl(6-t-buthoxy hexyl)dichlorosilane, through 1H-NMR.

1H-NMR ($CDCl_3$): 3.3 (t, 2H), 1.5 (m, 3H), 1.3 (m, 5H), 1.2 (s, 9H), 1.1 (m, 2H), 0.7 (s, 3H).

1.2 mol of tetramethylcyclopentadiene (150 g) and 2.4 L of THF were added to the reactor, and then the reactor temperature was cooled down to −20° C. 480 mL of n-BuLi was added to the reactor at a rate of 5 mL/min using a feeding pump. After n-BuLi was added, the mixture was stirred for 12 hours while slowly raising the reactor temperature to room temperature. After the reaction for 12 hours, an equivalent of methyl(6-t-buthoxy hexyl)dichlorosilane) (326 g, 350 mL) was rapidly added to the reactor. The mixture was stirred for 12 hours while slowly raising the reactor temperature to room temperature. Then, the reactor temperature was cooled to 0° C. again, and 2 equivalents of t-BuNH$_2$ was added. The mixture was stirred for 12 hours while slowly raising the reactor temperature to room temperature. After the reaction for 12 hours, THF was removed. Thereafter, 4 L of hexane was added and the salt was removed through a labdori to obtain a filtered solution. The filtered solution was added to the reactor again, and hexane was removed at 70° C. to obtain a yellow solution. The yellow solution obtained above was confirmed to be methyl (6-t-buthoxyhexyl)(tetramethylCpH)t-Butylaminosilane through $^1$H-NMR.

$TiCl_3(THF)_3$ (10 mmol) was rapidly added to a dilithium salt of a ligand at −78° C., which was synthesized from n-BuLi and the ligand of dimethyl(tetramethylCpH)t-butylaminosilane in THF solution. While slowly heating the reaction solution from −78° C. to room temperature, it was stirred for 12 hours. After stirring for 12 hours, an equivalent of $PbCl_2$ (10 mmol) was added to the reaction solution at room temperature, and then stirred for 12 hours. After stirring for 12 hours, a dark black solution having a blue color was obtained. THF was removed from the reaction solution thus obtained before hexane was added and the product was filtered. Hexane was removed from the filtered solution, and then the product was confirmed to be the desired (tBu-O—$(CH_2)_6$)($CH_3$)Si($C_5(CH_3)_4$)(tBu-N)$TiCl_2$, which is (t-butoxyhexylmethylsilyl(N-t-butylamido)(2,3,4,5-tetramethylcyclopentadienyl)-titaniumdichloride through 1H-NMR.

1H-NMR (CDCl3): 3.3 (s, 4H), 2.2 (s, 6H), 2.1 (s, 6H), 1.8-0.8 (m), 1.4 (s, 9H), 1.2 (s, 9H), 0.7 (s, 3H).

Preparation Examples of Supported Hybrid Metallocene Catalyst

Example 1: Supported Hybrid Metallocene Catalyst (1) Preparation of Support

Silica (SP 952, manufactured by Grace Davison Co.) was dehydrated and dried at a temperature of 600° C. for 12 hours under vacuum.

(2) Preparation of Supported Hybrid Metallocene Catalyst

About 3.0 kg of toluene solution was added to a 20 L stainless steel (sus) high pressure reactor, and about 1000 g of the silica support prepared in step (1) was added thereto, followed by stirring while raising the reactor temperature to about 40° C. After sufficient dispersion of the silica for about 60 minutes, about 0.1 mol of the first metallocene compound prepared in Synthesis Example 1 was dissolved to become a solution state, added thereto and then reacted while stirring for about 2 hours. Thereafter, the stirring was stopped, followed by settling for about 30 minutes and then decantation of the reaction solution.

Thereafter, 5.4 kg of 10 wt % methylaluminoxane (MAO)/toluene solution was added to the reactor, and the temperature was raised to 110° C., followed by stirring at about 200 rpm for about 12 hours. After lowering the temperature to 40° C. again, 2.0 kg of 10 wt % methylaluminoxane (MAO)/toluene solution was added and stirred for about 4 hours. Thereafter, the stirring was stopped, followed by settling for about 30 minutes and then decantation of the reaction solution.

About 3.0 kg of toluene was added to the reaction solution thus recovered, and stirred for about 10 minutes. Thereafter, about 0.1 mol of the second metallocene compound prepared in Synthesis Example 2 was dissolved to become a solution state, added thereto and then reacted while stirring for about 2 hours. Thereafter, the stirring was stopped, followed by settling for about 30 minutes and then decantation of the reaction solution. About 3.0 kg of hexane was added to the reactor, the hexane slurry was transferred to a filter dryer, and the hexane solution was filtered out. The supported hybrid metallocene catalyst was prepared by drying under reduced pressure at about 50° C. for about 4 hours.

Example 2: Supported Hybrid Metallocene Catalyst

A supported hybrid metallocene catalyst was prepared in the same manner as in Example 1, except that the temperature at which 5.4 kg of 10 wt % methylaluminoxane (MAO)/toluene solution was added was changed from 110° C. to 130° C. in Example 1.

Example 3: Supported Hybrid Metallocene Catalyst

A supported hybrid metallocene catalyst was prepared in the same manner as in Example 2, except that 6.8 kg of 10 wt % methylaluminoxane (MAO)/toluene solution was added at 130° C. and 1.5 kg of the same was added at 40° C.

Comparative Example 1: Supported Hybrid Metallocene Catalyst (1) Preparation of Support Silica (SP 952, manufactured by Grace Davison Co.) was dehydrated and dried at a temperature of 600° C. for 12 hours under vacuum.

(2) Preparation of Supported Hybrid Metallocene Catalyst

About 3.0 kg of toluene solution was added to a 20 L stainless steel (sus) high pressure reactor, and about 1000 g of the silica support prepared in step (1) was added thereto, followed by stirring while raising the reactor temperature to about 40° C. After sufficient dispersion of the silica for about 60 minutes, about 0.1 mol of the first metallocene compound prepared in Synthesis Example 1 was dissolved to become a solution state, added thereto and then reacted while stirring for about 2 hours. Thereafter, the stirring was stopped, followed by settling for about 30 minutes and then decantation of the reaction solution.

Thereafter, 7.4 kg of 10 wt % methylaluminoxane (MAO)/toluene solution was added to the reactor, and the temperature was raised to 60° C., followed by stirring at about 200 rpm for about 12 hours. After lowering the temperature to 40° C. again, the stirring was stopped, followed by settling for about 30 minutes and then decantation of the reaction solution.

About 3.0 kg of toluene was added to the reaction solution thus recovered, and stirred for about 10 minutes. Thereafter, about 0.1 mol of the second metallocene compound prepared in Synthesis Example 2 was dissolved to become a solution state, added thereto and then reacted while stirring for about 2 hours. Thereafter, the stirring was stopped, followed by settling for about 30 minutes and then decantation of the reaction solution. About 3.0 kg of hexane was added to the reactor, the hexane slurry was transferred to a filter dryer, and the hexane solution was filtered out. The supported hybrid metallocene catalyst was prepared by drying under reduced pressure at about 50° C. for about 4 hours.

Comparative Example 2: Supported Hybrid Metallocene Catalyst

A supported hybrid metallocene catalyst was prepared in the same manner as in Example 1, except that the temperature at which 5.4 kg of 10 wt % methylaluminoxane (MAO)/toluene solution was added was changed from 110° C. to 60° C. in Example 1.

Comparative Example 3: Supported Hybrid Metallocene Catalyst

A supported hybrid metallocene catalyst was prepared in the same manner as in Example 1, except that the temperature at which 5.4 kg of 10 wt % methylaluminoxane (MAO)/toluene solution was added was changed from 110° C. to 80° C. in Example 1.

Comparative Example 4: Supported Hybrid Metallocene Catalyst

A supported hybrid metallocene catalyst was prepared in the same manner as in Comparative Example 1, except that the temperature at which 7.4 kg of 10 wt % methylaluminoxane (MAO)/toluene solution was added was changed from 60° C. to 110° C. in Comparative Example 1.

Comparative Example 5: Supported Hybrid Metallocene Catalyst (1) Preparation of Support Silica (SP 952, manufactured by Grace Davison Co.) was dehydrated and dried at a temperature of 180° C. for 12 hours under vacuum.

(2) Preparation of Supported Hybrid Metallocene Catalyst

About 3.0 kg of toluene solution was added to a 20 L stainless steel (sus) high pressure reactor, and about 1000 g of the silica support prepared in step (1) was added thereto, followed by stirring while raising the reactor temperature to about 40° C.

After sufficient dispersion of the silica for about 60 minutes, 7.4 kg of 10 wt % methylaluminoxane (MAO)/toluene solution was added to the reactor, and the temperature was raised to 110° C., followed by stirring at about 200 rpm for about 12 hours. After lowering the temperature to 40° C. again, the stirring was stopped, followed by settling for about 30 minutes and then decantation of the reaction solution.

About 3.0 kg of toluene was added to the reaction solution thus recovered, and stirred for about 10 minutes. Thereafter, about 0.1 mol of the first metallocene compound prepared in Synthesis Example 1 was dissolved to become a solution state, added thereto and then reacted while stirring for about 2 hours. Thereafter, about 0.1 mol of the second metallocene compound prepared in Synthesis Example 2 was dissolved to become a solution state, added thereto and then reacted while stirring for about 2 hours. Thereafter, the stirring was stopped, followed by settling for about 30 minutes and then decantation of the reaction solution. About 3.0 kg of hexane was added to the reactor, the hexane slurry was transferred to a filter dryer, and the hexane solution was filtered out. The supported hybrid metallocene catalyst was prepared by drying under reduced pressure at about 50° C. for about 4 hours.

Comparative Example 6: Supported Hybrid Metallocene Catalyst (1) Preparation of Support Silica (SP 952, manufactured by Grace Davison Co.) was dehydrated and dried at a temperature of 180° C. for 12 hours under vacuum.

(2) Preparation of Supported Hybrid Metallocene Catalyst

About 3.0 kg of toluene solution was added to a 20 L stainless steel (sus) high pressure reactor, and about 1000 g of the silica support prepared in step (1) was added thereto, followed by stirring while raising the reactor temperature to about 40° C.

After sufficient dispersion of the silica for about 60 minutes, 5.4 kg of 10 wt % methylaluminoxane (MAO)/toluene solution was added to the reactor, and the temperature was raised to 110° C., followed by stirring at about 200 rpm for about 12 hours. After lowering the temperature to 40° C. again, 2.0 kg of 10 wt % methylaluminoxane (MAO)/toluene solution was added and stirred for about 4 hours. Thereafter, the stirring was stopped, followed by settling for about 30 minutes and then decantation of the reaction solution.

About 3.0 kg of toluene was added to the reaction solution thus recovered, and stirred for about 10 minutes. Thereafter, about 0.1 mol of the first metallocene compound prepared in Synthesis Example 1 was dissolved to become a solution state, added thereto and then reacted while stirring for about 2 hours. Thereafter, about 0.1 mol of the second metallocene compound prepared in Synthesis Example 2 was dissolved to become a solution state, added thereto and then reacted while stirring for about 2 hours. Thereafter, the stirring was stopped, followed by settling for about 30 minutes and then decantation of the reaction solution. About 3.0 kg of hexane was added to the reactor, the hexane slurry was transferred to a filter dryer, and the hexane solution was filtered out. The supported hybrid metallocene catalyst was prepared by drying under reduced pressure at about 50° C. for about 4 hours.

In the supported hybrid catalyst preparation process according to Examples 1 to 3 and Comparative Examples 1 to 6, a supporting content, a supporting temperature, and a supporting order of the first metallocene compound, the second metallocene compound, and the cocatalyst are shown in Table 1 below.

TABLE 1

| | First metallocene compound | | Second metallocene compound | | Cocatalyst | | | | | |
|---|---|---|---|---|---|---|---|---|---|---|
| | | | | | Primary | Primary | Secondary | Secondary | | |
| | Content (mmol/gSiO$_2$) | Temp. (° C.) | Content (mmol/gSiO$_2$) | Temp. (° C.) | content (mmol/gSiO$_2$) | temp. (° C.) | content (mmol/gSiO$_2$) | temp. (° C.) | Separate input | Supporting order |
| Ex. 1 | 0.1 | 40 | 0.1 | 40 | 8 | 110 | 3 | 40 | ○ | Precursor 1/MAO/Precursor 2 |
| Ex. 2 | 0.1 | 40 | 0.1 | 40 | 8 | 130 | 3 | 40 | ○ | Precursor 1/MAO/Precursor 2 |
| Ex. 3 | 0.1 | 40 | 0.1 | 40 | 9 | 130 | 2 | 40 | ○ | Precursor 1/MAO/Precursor 2 |
| Comp. Ex. 1 | 0.1 | 40 | 0.1 | 40 | 11 | 60 | none | none | X | Precursor 1/MAO/Precursor 2 |
| Comp. Ex. 2 | 0.1 | 40 | 0.1 | 40 | 8 | 60 | 3 | 40 | ○ | Precursor 1/MAO/Precursor 2 |
| Comp. Ex. 3 | 0.1 | 40 | 0.1 | 40 | 8 | 80 | 3 | 40 | ○ | Precursor 1/MAO/Precursor 2 |
| Comp. Ex. 4 | 0.1 | 40 | 0.1 | 40 | 11 | 110 | none | none | X | Precursor 1/MAO/Precursor 2 |
| Comp. Ex. 5 | 0.1 | 40 | 0.1 | 40 | 11 | 110 | none | none | X | MAO/Precursor 1/Precursor 2 |
| Comp. Ex. 6 | 0.1 | 40 | 0.1 | 40 | 8 | 110 | 3 | 40 | ○ | MAO/Precursor 1/Precursor 2 |

In the preparation of the supported catalyst in Table 1, the supporting order of the first metallocene compound (precursor 1), the second metallocene compound (precursor 2), and the cocatalyst (MAO) was expressed as "I".

Preparation Examples of Polymerization of Olefinic Monomer

Preparation Examples 1 to 3 and Comparative Preparation Examples 1 to 6: Homopolymerization of Ethylene Under the conditions as shown in Table 2 below, an ethylene homopolymerization reaction of Preparation Examples 1 to 3 and Comparative Preparation Examples 1 to 6 was performed using the supported hybrid metallocene catalyst of Examples 1 to 3 and Comparative Examples 1 to 6.

2 mL (1 M in hexane) of triethylaluminum (TEAL) was added to a 2 L autoclave high pressure reactor, 0.6 kg of hexane was added thereto, and the temperature was raised to 80° C. while stirring at 500 rpm. The supported hybrid catalyst and hexane were injected to a vial and added to the reactor, followed by additional 0.2 kg of hexane. When the temperature inside the reactor reached 80° C., the reaction was carried out for 1 hour while stirring at 500 rpm under an ethylene pressure of 30 bar. After the completion of the reaction, the obtained polymer was first filtered to remove hexane, and dried in an oven at 80° C. for 3 hours.

In the polymerization process of Preparation Examples 1 to 3 and Comparative Preparation Examples 1 to 6, the catalytic activity and physical properties of the prepared polyolefin were measured as follows, and the results are shown in Table 2 below.

(1) Catalytic activity (kgPE/gSiO$_2$): The catalytic activity of the catalyst used in each of Examples and Comparative Examples was calculated by measuring a weight of the catalyst used in the polymerization reaction and a weight of the polymer prepared through the polymerization reaction.

Specifically, the weight (kg) of the polyethylene obtained after the polymerization process and the drying process was measured to be a kgPE value, and the weight (g) of the supported catalyst used in the polymerization process was measured to be gSiO$_2$. And, the catalytic activity was calculated by dividing the weight (kg) of the obtained polyethylene (kgPE) by the weight (g) of the supported catalyst (gSiO$_2$).

(2) Weight average molecular weight (Mw) and molecular weight distribution (MWD, polydispersity index): The weight average molecular weight (Mw) and the number average molecular weight (Mn) were measured using gel permeation chromatography (GPC, manufactured by Water).

The MWD (Mw/Mn) was calculated by dividing the weight average molecular weight by the number average molecular weight.

Specifically, PL-GPC220 manufactured by Waters was used as the gel permeation chromatography (GPC) instrument, and a Polymer Laboratories PLgel MIX-B 300 mm length column was used. An evaluation temperature was 160° C., and 1,2,4-trichlorobenzene was used for a solvent at a flow rate of 1 mL/min. Each polyethylene sample was pretreated by dissolving in 1,2,4-trichlorobenzene containing 0.0125% of BHT for 10 hours using a GPC analyzer (PL-GP220), and the sample with a concentration of 10 mg/10 mL was supplied in an amount of 200 μL. Mw and Mn were obtained using a calibration curve formed using a polystyrene standard. 9 kinds of the polystyrene standard were used with the molecular weight (g/mol) of 2000/10000/30000/70000/200000/700000/2000000/4000000/10000000.

(3) Particle size distribution (PSD): Polymers were separated by a particle size using sieves (size: 850 μm, 500 μm, 300 μm, 180 μm).

Specifically, the polymer was separated according to the particle size using the above-described sieves as follows: in case of the particle size of the polymer is larger than 850 μm (>850), in case of larger than 500 μm and 850 μm or less (>500), in case of larger than 300 μm and 500 μm or less (>300), in case of larger than 180 μm and 300 μm or less (>180), and in case of 180 μm or less (fine). And the weights of the polymers separated by the corresponding particle size were measured and expressed as a percentage (wt %), respectively, based on a total weight of the polymer.

The particle size distribution (PSD) result was expressed as PSD with the weight values that were simply separated using sieves in the laboratory, without using a specific instrument or specific criteria.

(4) Bulk density (BD): It was measured in accordance with ASTM D 1895 Method A. Specifically, after filling a 100 mL SUS container with a polymer, a weight (g) of the polymer was measured and the bulk density was expressed as a weight per unit volume (g/mL).

(5) Al supporting rate (%): The Al supporting rate in the supported catalyst was measured by an inductively coupled plasma spectrometer (ICP) analysis method. At this time, the Al supporting rate (%) represents an amount of the actually supported cocatalyst relative to an amount of the cocatalyst (Al) added in the preparation of the supported catalyst as a percentage value.

Specifically, the equipment used for the analysis was ICP-OES (Perkin Elmer), the analysis conditions were set to Plasma Gas 12 L/min, Auxiliary Gas 0.2 L/min, and Nebulizer Gas 0.8 L/min, RF Power was 1300 WATTS, and a sample flow rate was 1.50 mL/min with Radial View.

TABLE 2

| | Catalyst | Al supporting rate (ICP analysis, %) | Catalytic activity (kgPE/gSiO$_2$) | BD (g/mL) | MWD | Particle size distribution (wt %, Sieve, μm) | | | | |
|---|---|---|---|---|---|---|---|---|---|---|
| | | | | | | >850 | >500 | >300 | >180 | Fine |
| Prep. Ex. 1 | Ex. 1 | 90 | 10.8 | 0.40 | 4.2 | 30.4 | 52.8 | 16.4 | 0.4 | 0 |
| Prep. Ex. 2 | Ex. 2 | 89 | 12 | 0.40 | 4.3 | 32.3 | 49.0 | 18.1 | 0.6 | 0 |
| Prep. Ex. 3 | Ex. 3 | 89 | 9.9 | 0.41 | 4.2 | 27.9 | 55.0 | 16.2 | 0.9 | 0 |
| Comp. Prep. Ex. 1 | Comp. Ex. 1 | 79 | 8.9 | 0.35 | 4.0 | 10.1 | 51.9 | 36.6 | 1.2 | 0.2 |

TABLE 2-continued

| | Catalyst | Al supporting rate (ICP analysis, %) | Catalytic activity (kgPE/gSiO$_2$) | BD (g/mL) | MWD | Particle size distribution (wt %, Sieve, μm) | | | | |
|---|---|---|---|---|---|---|---|---|---|---|
| | | | | | | >850 | >500 | >300 | >180 | Fine |
| Comp. Prep. Ex. 2 | Comp. Ex. 2 | 81 | 9.2 | 0.35 | 4.0 | 14.0 | 54.3 | 30.3 | 1.2 | 0.2 |
| Comp. Prep. Ex. 3 | Comp. Ex. 3 | 83 | 9.6 | 0.36 | 4.0 | 12.5 | 50.2 | 35.5 | 1.5 | 0.3 |
| Comp. Prep. Ex. 4 | Comp. Ex. 4 | 85 | 9.9 | 0.37 | 4.1 | 11.3 | 52.8 | 34.3 | 1.3 | 0.3 |
| Comp. Prep. Ex. 5 | Comp. Ex. 5 | 84 | 11.0 | 0.39 | 3.3 | 22.1 | 57.2 | 19.4 | 1.2 | 0.1 |
| Comp. Prep. Ex. 6 | Comp. Ex. 6 | 88 | 12.2 | 0.37 | 3.0 | 28.3 | 58.5 | 11.7 | 1.3 | 0.2 |

Referring to Table 2, it was confirmed that Preparation Examples 1 to 3 could prepare a polyethylene satisfying both the high bulk density of 0.40 g/mL to 0.41 g/mL and the broad molecular weight distribution of 4.2 to 4.3. In particular, Preparation Examples 1 to 3 have an advantage in that the bulk density was rather increased while the catalytic activity was maintained as high as 9.9 kgPE/gSiO$_2$ to 12 kgPE/gSiO$_2$ with the large particle size and the narrow distribution. As a result, it can be seen that each of the particles of the resulting polymer is densely produced, and productivity can be increased by improving the settling efficiency when applied to an actual pilot process or continuous process.

The supported hybrid catalysts of Examples 1 to 3 used in the polyethylene polymerization process of Preparation Examples 1 to 3 can broaden MWD of the polymer and thus processability of the polymer can be improved by supporting the first metallocene precursor prior to the cocatalyst. In addition, the supported hybrid catalyst of Example 1 dividedly supported the cocatalyst sequentially at high temperatures in order to evenly support the cocatalyst to the inside of the support, thereby significantly increasing the bulk density of the resulting polymer.

In particular, when the Al content in the supported catalyst was analyzed by ICP for the supported hybrid catalysts of Examples 1 to 3, Examples 1 to 3 in which the cocatalysts were dividedly supported at high temperatures showed significantly higher Al supporting rates of 89% and 90%, even though the same amount of cocatalyst as Comparative Examples 1 to 6 was added.

On the other hand, Comparative Preparation Examples 1 to 6 did not obtain a polymer satisfying the bulk density (BD), molecular weight distribution (MWD) and particle size distribution at the same time.

Specifically, in Comparative Preparation Examples 1 to 3, the bulk density of the polyethylene was lower than that of Preparation Examples 1 to 3 by applying the catalysts of Comparative Examples 1 to 3 in which the cocatalysts were all or partly supported at a low temperature of 60° C. to 80° C. Also, in Comparative Preparation Example 4, the bulk density of the polyethylene was lower than that of the case where the cocatalyst was dividedly added by applying the supported hybrid catalyst of Comparative Example 4 in which the cocatalyst was supported at a high temperature of 110° C. at once. In particular, in Comparative Preparation Examples 1 to 4, the first metallocene compound was supported prior to the cocatalyst, so that the molecular weight distribution (MWD) of the polymer was broad, but the particle size distribution of the polymer was broad and the bulk density (BD) was low. Thus, it was difficult to expect an increase in productivity.

In Comparative Preparation Examples 5 and 6, the molecular weight distribution (MWD) of the polymer was significantly decreased and narrowed by applying a supported hybrid catalyst in which the cocatalyst was supported prior to the catalyst precursor.

Preparation Example 4 and Comparative Preparation Examples 7 to 9: Ethylene-1-Hexene Copolymerization Under the conditions as shown in Table 3 below, an ethylene-1-hexene copolymerization reaction of Preparation Example 4 and Comparative Preparation Examples 7 to 9 was performed using the supported hybrid metallocene catalyst of Example 1 and Comparative Examples 1, 4 and 5.

At this time, the polymerization reactor was a continuous polymerization reactor of an isobutane slurry loop process, that is, a loop slurry reactor, the reactor volume was 140 L, and the reaction flow rate was operated at about 7 m/s. Gases (ethylene, hydrogen) and comonomer (1-hexene) required for the polymerization were constantly and continuously injected, and the individual flow rate was adjusted to the target product. The concentration of all gases and comonomer (1-hexene) was confirmed by on-line gas chromatograph. The supported catalyst was added to an isobutane slurry, the reactor pressure was maintained at about 40 bar, and the polymerization was performed at a temperature of about 93° C.

In the polymerization process of Preparation Example 4 and Comparative Preparation Examples 7 to 9, the catalytic activity and physical properties of the prepared polyolefin were measured and the results are shown in Table 3 below. Among these, the catalytic activity, Mw, MWD, and BD were measured by the method as mentioned above.

(6) Ethylene load (C2) weight (kg/h): When carrying out the ethylene-1-hexene copolymerization reaction under the polymerization conditions as described above, the ethylene consumption per hour (amount of polymer produced), that is, ethylene load weight per unit time (kg/h) was measured.

(7) $MI_{2.16}$ and MFRR (21.6/2.16): The melt index ($MI_{2.16}$) was measured in accordance with ASTM D 1238 (condition E, 190° C., 2.16 kg load).

The melt flow rate ratio (MFRR, 21.6/2.16) was calculated by dividing $MFR_{21.6}$ by $MFR_{2.16}$, and the $MFR_{21.6}$ was measured in accordance with ISO 1133 at 190° C. under a load of 21.6 kg and the $MFR_{2.16}$ was measured in accordance with ISO 1133 at 190° C. under a load of 2.16 kg.

(8) Density (density): The density was measured in accordance with ASTM D 1505.

(9) Slurry density (DI): The slurry density refers to an amount of polymer per unit volume in the slurry loop reactor, and was measured using radiation.

(10) Settling efficiency (SE, %): The settling efficiency was measured by the following Equation 1.

Settling efficiency(%)=amount of ethylene used/(amount of ethylene used+solvent content)×100.  [Equation 1]

TABLE 3

| Catalyst | Prep. Ex. 4 Ex. 1 | Comp. Prep. Ex. 7 Comp. Ex. 1 | Comp. Prep. Ex. 8 Comp. Ex. 4 | Comp. Prep. Ex. 9 Comp. Ex. 5 |
|---|---|---|---|---|
| C2 (kg/h) | 40 | 33 | 34 | 32 |
| MWD | 4.5 | 4.3 | 4.3 | 3.0 |
| MFRR ($MI_{21.6}/MI_{2.16}$) | 33.5 | 32.2 | 31.8 | 28.5 |
| BD (g/mL) | 0.49 | 0.44 | 0.46 | 0.45 |
| Density (g/cm$^3$) | 0.935 | 0.934 | 0.935 | 0.935 |
| DI (kg/m$^3$) | 562 | 561 | 560 | 560 |
| SE (%) | 68 | 62 | 63 | 61 |
| Activity (kgPE/gSiO$_2$) | 11.5 | 10.4 | 10.9 | 12.0 |

Referring to Table 3, it was confirmed that Preparation Example 4 could effectively prepare a polyolefin having a high bulk density and a broad molecular weight distribution by using the supported hybrid catalyst of Example 1 in which the first metallocene precursor was supported and then the cocatalyst was dividedly supported, followed by the second metallocene precursor.

Particularly, in Preparation Example 4, the cocatalyst was first supported at a high temperature of 110° C. and then the rest was sequentially supported at 40° C. to evenly support the cocatalyst to the inside of the support. Therefore, when a continuous polymerization was performed under the same temperature, pressure and slurry density (DI), the settling efficiency (S. E) and the ethylene load were greatly increased while maintaining the high activity. Specifically, the settling efficiency (S. E) of Preparation Example 4 was further improved by about 7.9% to about 11.5% compared to Comparative Preparation Examples 7 to 9. As a result, it was confirmed that the ethylene load weight per hour of Preparation Example 4 was further increased by about 17.6% to about 25% compared to Comparative Preparation Examples 7 to 9, and thus productivity in the slurry loop polymerization process, which is a pilot continuous process, was significantly improved.

The invention claimed is:

1. A method for preparing a supported hybrid metallocene catalyst, comprising the steps of:
    supporting at least one first metallocene compound on a silica support;
    supporting an aluminum-based cocatalyst by contacting the silica support on which the first metallocene compound is supported with at least one aluminum-based cocatalyst compound; and
    supporting at least one second metallocene compound on the silica support on which the aluminum-based cocatalyst is supported;
    wherein the aluminum-based cocatalyst is supported on the silica support on which the first metallocene compound is supported by a separate-input method in which 50% by weight to 90% by weight of a whole input of at least one aluminum-based cocatalyst compound is primarily added at a temperature of 100° C. to 150° C., and the rest of the whole input is secondarily added at a temperature of −5° C. to 40° C.

2. The method for preparing a supported hybrid metallocene catalyst according to claim 1, wherein a supported amount of the first metallocene compound or the second metallocene compound is 0.01 mmol/g to 1 mmol/g based on 1 g of the silica support, respectively.

3. The method for preparing a supported hybrid metallocene catalyst according to claim 1, wherein each of the first metallocene compound and the second metallocene compound is represented by one of the following Chemical Formulae 1 to 5:

[Chemical Formula 1]

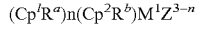

in Chemical Formula 1,
$M^1$ is a group 4 transition metal;
$Cp^1$ and $Cp^2$ are the same as or different from each other, and are each independently selected from the group consisting of cyclopentadienyl, indenyl, 4,5,6,7-tetrahydro-1-indenyl, and a fluorenyl radical, each of which is optionally substituted with a C1-C20 hydrocarbon;
$R^a$ and $R^b$ are the same as or different from each other, and are each independently hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl, provided that at least one of $R^a$ or $R^b$ is not hydrogen;
$Z^1$ is each independently a halogen, a C1-C20 alkyl, a C2-C10 alkenyl, a C7-C40 alkylaryl, a C7-C40 arylalkyl, a C6-C20 aryl, a substituted or unsubstituted C1-C20 alkylidene, a substituted or unsubstituted amino group, a C2-C20 alkylalkoxy, or a C7-C40 arylalkoxy; and
n is 1 or 0;

[Chemical Formula 2]

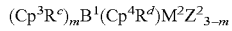

in Chemical Formula 2,
$M^2$ is a group 4 transition metal;
$Cp^3$ and $Cp^4$ are the same as or different from each other, and are each independently selected from the group consisting of cyclopentadienyl, indenyl, 4,5,6,7-tetrahydro-1-indenyl, and a fluorenyl radical, each of which is optionally substituted with a C1-C20 hydrocarbon;
$R^c$ and $R^d$ are the same as or different from each other, and are each independently hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl;
$Z^2$ is each independently a halogen, a C1-C20 alkyl, a C2-C10 alkenyl, a C7-C40 alkylaryl, a C7-C40 arylalkyl, a C6-C20 aryl, a substituted or unsubstituted C1-C20 alkylidene, a substituted or unsubstituted amino group, a C2-C20 alkylalkoxy, or a C7-C40 arylalkoxy;

B¹ is at least one radical comprising a carbon, germanium, silicon, phosphorus, or nitrogen atom, which cross-links the $Cp^3R^c$ ring and the $Cp^4R^d$ ring or cross-links the $Cp^4R^d$ ring and $M^2$; and m is 1 or 0;

[Chemical Formula 3]

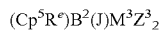

in Chemical Formula 3, $M^3$ is a group 4 transition metal;

$Cp^5$ is selected from the group consisting of cyclopentadienyl, indenyl, 4,5,6,7-tetrahydro-1-indenyl, and a fluorenyl radical, each of which is optionally substituted with a C1-C20 hydrocarbon;

$R^e$ is hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl;

$Z^3$ is each independently a halogen, a C1-C20 alkyl, a C2-C10 alkenyl, a C7-C40 alkylaryl, a C7-C40 arylalkyl, a C6-C20 aryl, a substituted or unsubstituted C1-C20 alkylidene, a substituted or unsubstituted amino group, a C2-C20 alkylalkoxy, or a C7-C40 arylalkoxy;

B² is at least one radical comprising a carbon, germanium, silicon, phosphorus, or nitrogen atom, which cross-links the $Cp^5R^e$ ring and J; and J is selected from the group consisting of $NR^f$, O, $PR^f$ and S, where $R^f$ are each independently a C1-C20 alkyl, an aryl, a substituted alkyl, or a substituted aryl;

[Chemical Formula 4]

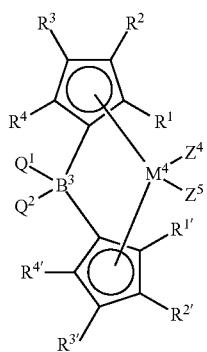

in Chemical Formula 4, $R^1$ to $R^4$ and $R^{1'}$ to $R^{4'}$ are the same as or different from each other, and are each independently hydrogen, a C1-C20 alkyl group, a C2-C20 alkenyl group, a C6-C20 aryl group, a C7-C20 alkylaryl group, a C7-C20 arylalkyl group, or a C1-C20 amine group, and two or more adjacent groups of $R^1$ to $R^4$ and $R^{1'}$ to $R^{4'}$ are optionally connected with each other to form one or more aliphatic rings, aromatic rings, or hetero rings;

$Q^1$ and $Q^2$ are the same as or different from each other, and are each independently hydrogen, a C1-C20 alkyl group, a C3-C20 cycloalkyl group, a C1-C20 alkoxy group, a C6-C20 aryl group, a C6-C10 aryloxy group, a C2-C20 alkenyl group, a C7-C40 alkylaryl group, or a C7-C40 arylalkyl group;

$B^3$ is a C2-C20 alkylene group, a C3-C20 cycloalkylene group, a C6-C20 arylene group, a C7-C40 alkylarylene group, or a C7-C40 arylalkylene group;

$M^4$ is a group 4 transition metal; and $Z^4$ and $Z^5$ are the same as or different from each other, and are each independently a halogen, a C1-C20 alkyl group, a C2-C10 alkenyl group, a C6-C20 aryl group, a nitro group, an amido group, a C1-C20 alkylsilyl group, a C1-C20 alkoxy group, or a C1-C20 sulfonate group;

[Chemical Formula 5]

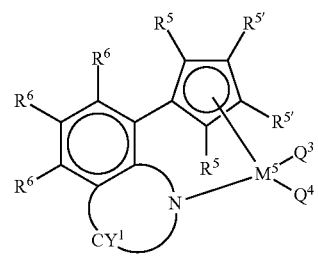

in Chemical Formula 5, $R^5$ and $R^{5\square}$ are the same as or different from each other, and are each independently hydrogen, a C1-C20 alkyl, a C2-C20 alkenyl, a C6-C20 aryl, a C6-C20 silyl, a C7-C20 alkylaryl, a C7-C20 arylalkyl, or a metalloid of a group 4 metal substituted with a hydrocarbyl, and $R^5$ and $R^{5\square}$, or two $R^{5\square}$s are optionally connected with each other by an alkylene comprising a C1-C20 alkyl or a C6-C20 aryl to form a ring;

$R^6$ are is each independently hydrogen, a halogen, a C1-C20 alkyl, a C2-C20 alkenyl, a C6-C20 aryl, a C7-C20 alkylaryl, a C7-C20 arylalkyl, a C1-C20 alkoxy, a C6-C20 aryloxy, or an amido, and two or more groups of $R^6$s are optionally connected with each other to form an aliphatic ring or an aromatic ring;

$CY^1$ together with N form a substituted or unsubstituted aliphatic or aromatic ring, and a substituent of $CY^1$ is a halogen, a C1-C20 alkyl, a C2-C20 alkenyl, a C6-C20 aryl, a C7-C20 alkylaryl, a C7-C20 arylalkyl, a C1-C20 alkoxy, a C6-C20 aryloxy, or an amido, wherein two or more substituents are optionally connected with each other to form an aliphatic ring or an aromatic ring;

$M^5$ is a group 4 transition metal; and $Q^3$ and $Q^4$ are the same as or different from each other, and are independently a halogen, a C1-C20 alkyl, a C2-C20 alkenyl, a C6-C20 aryl, a C7-C20 alkylaryl, a C7-C20 arylalkyl, a C1-C20 alkylamido, a C6-C20 arylamido, or a C1-C20 alkylidene.

4. The method for preparing a supported hybrid metallocene catalyst according to claim 3, wherein the metallocene compound represented by the Chemical Formula 1 is any one of the following structural formulae:

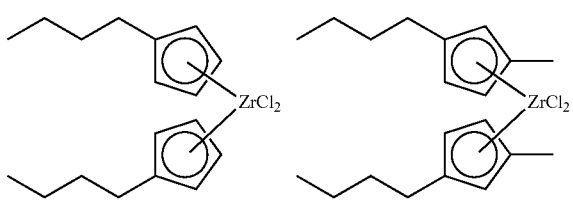

-continued
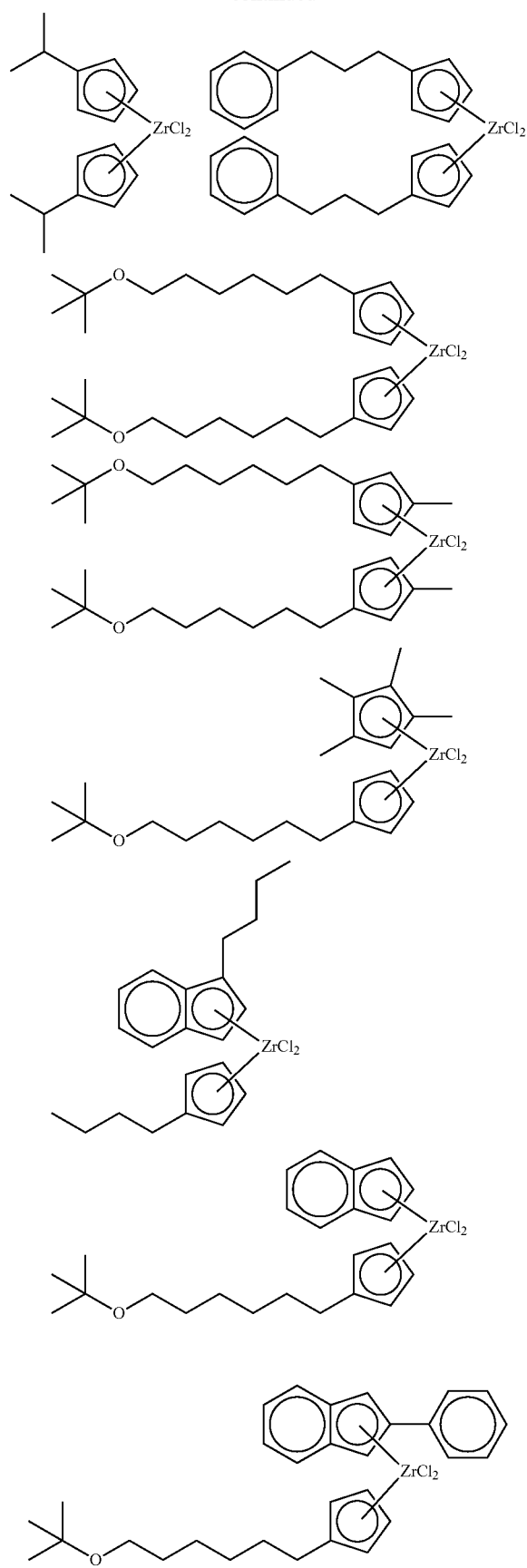
-continued
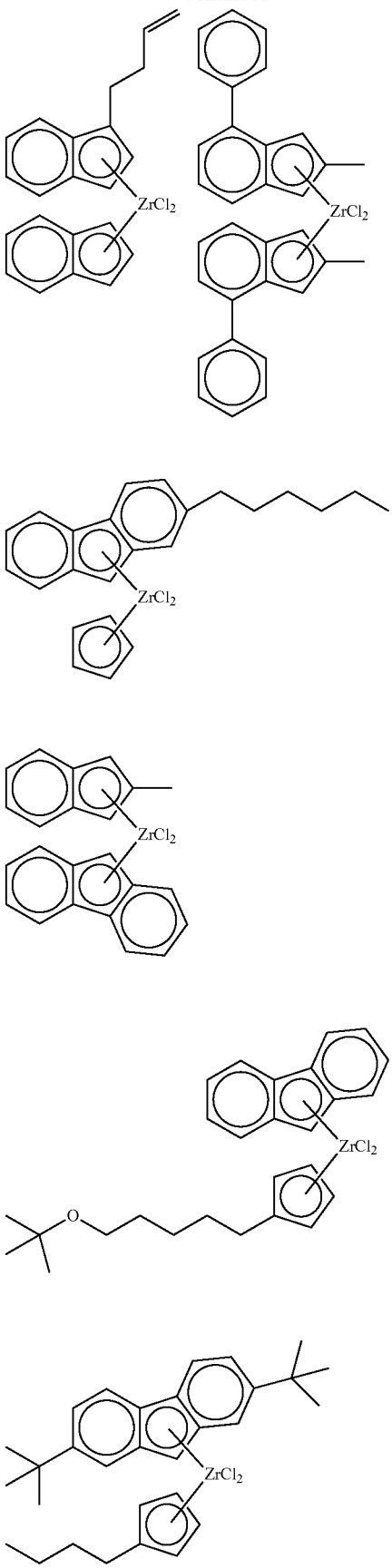

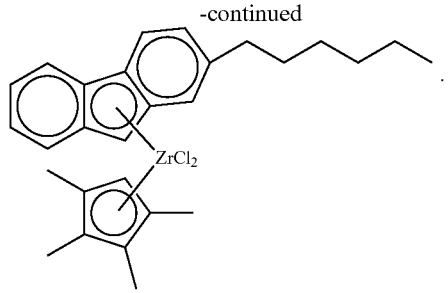
5. The method for preparing a supported hybrid metallocene catalyst according to claim 3, wherein the metallocene compound represented by the Chemical Formula 2 is any one of the following structural formulae:
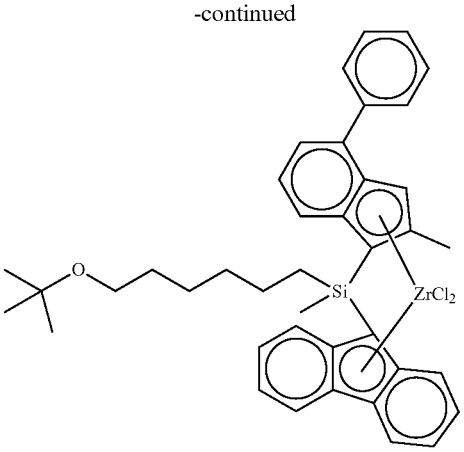
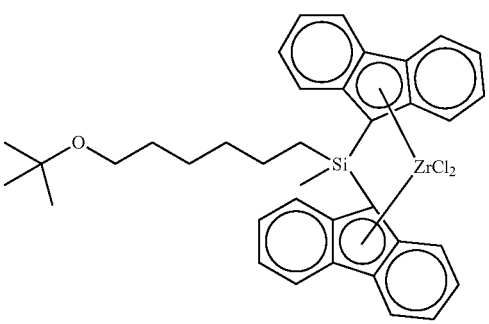
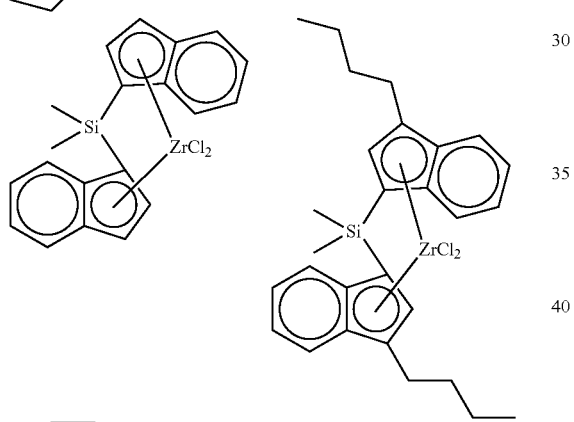
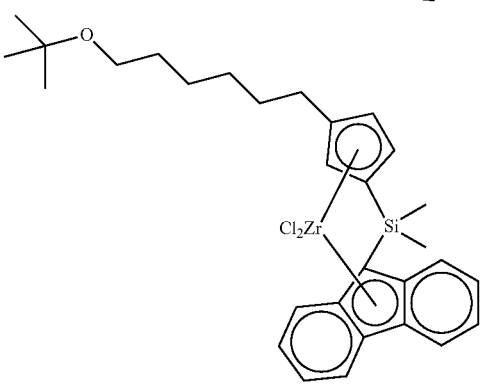
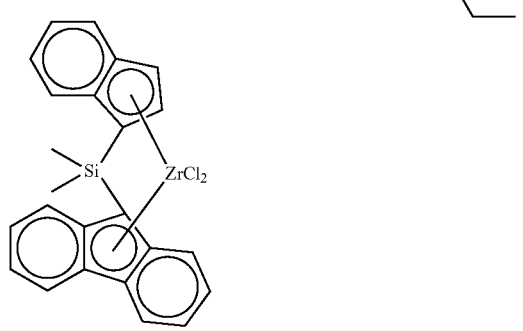
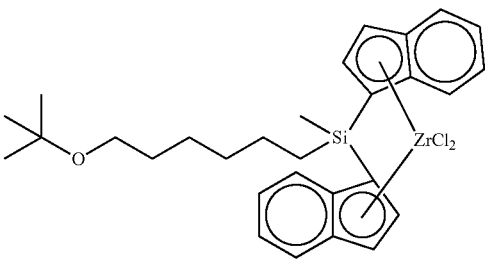
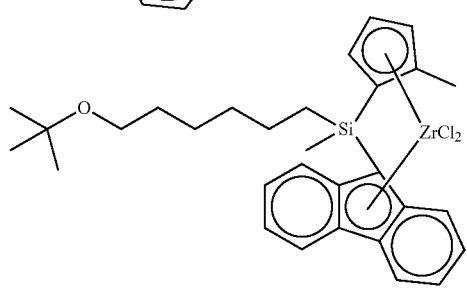
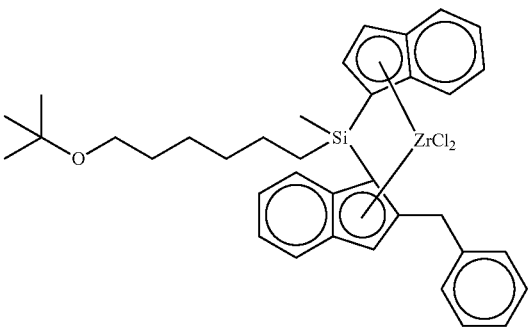

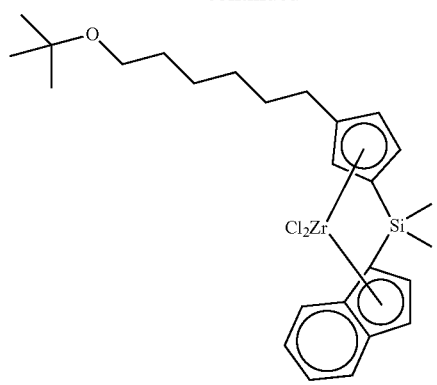
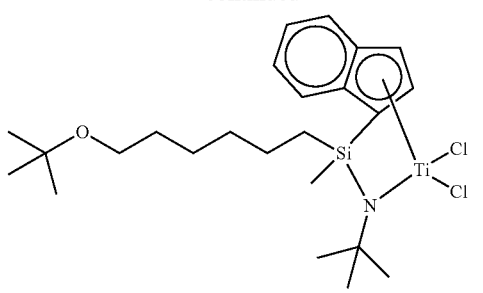
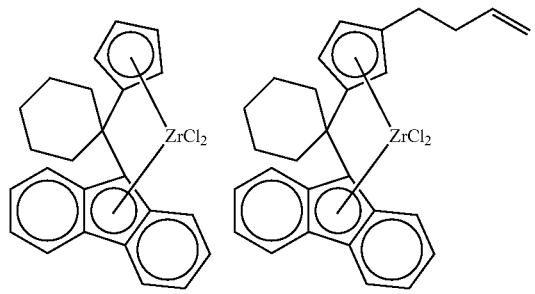
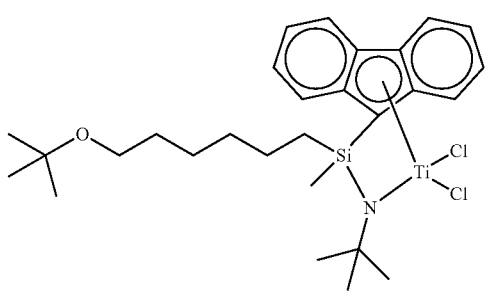
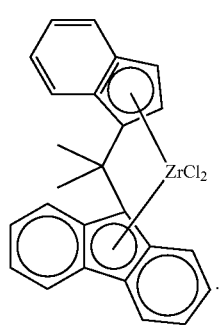
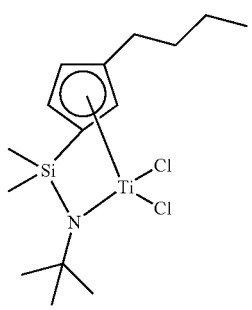
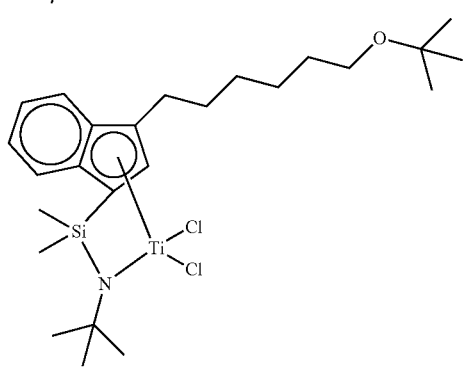
6. The method for preparing a supported hybrid metallocene catalyst according to claim 3, wherein the metallocene compound represented by the Chemical Formula 3 is any one of the following structural formulae:
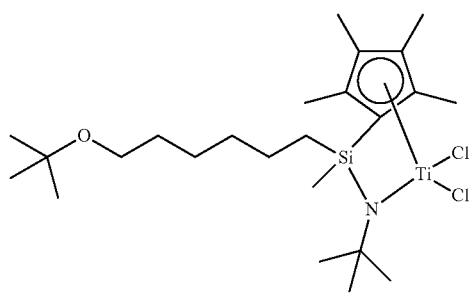
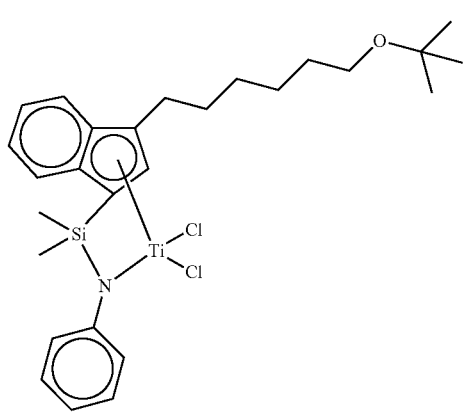

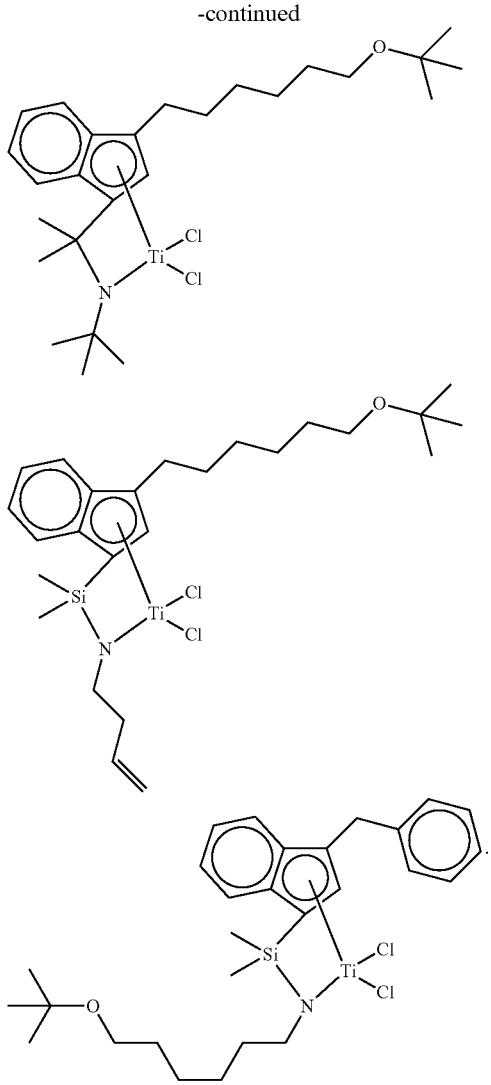
7. The method for preparing a supported hybrid metallocene catalyst according to claim 3, wherein the metallocene compound represented by the Chemical Formula 4 is any one of the following structural formulae:
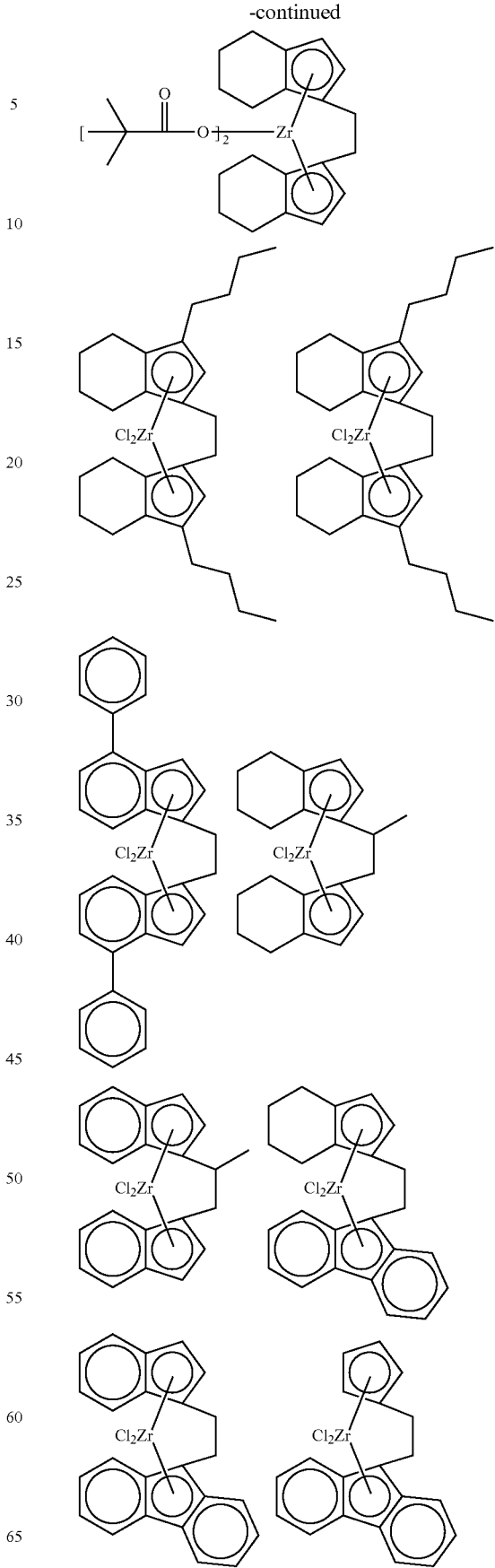

-continued
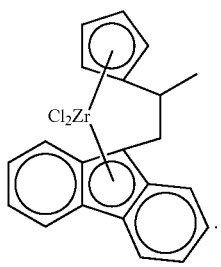
8. The method for preparing a supported hybrid metallocene catalyst according to claim 3, wherein the metallocene compound represented by the Chemical Formula 5 is any one of the following structural formulae:
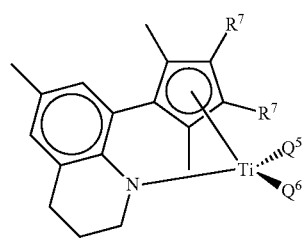
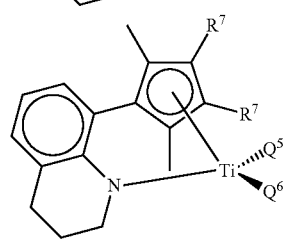
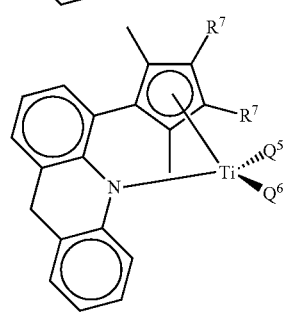
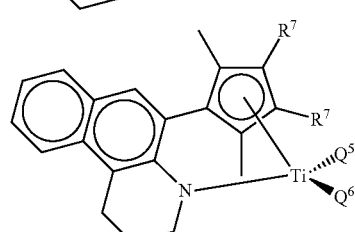
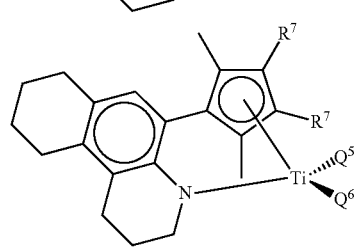
-continued
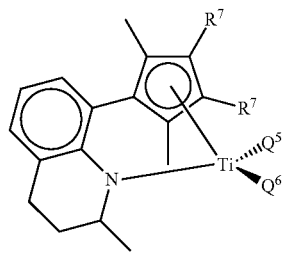
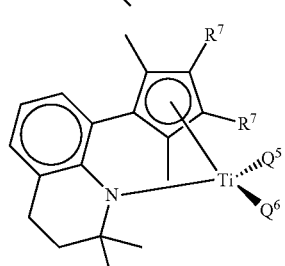
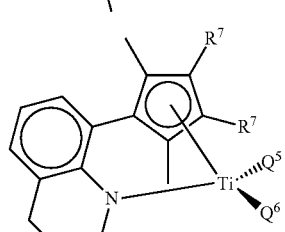
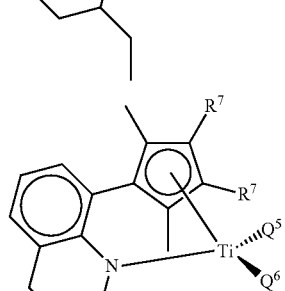
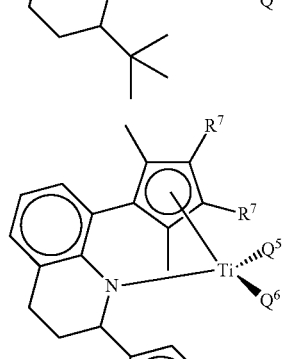
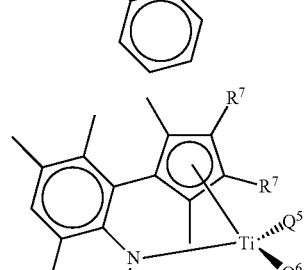

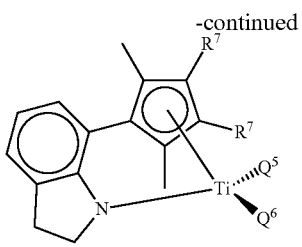

in the above structural formulae, $R^7$ are each independently hydrogen or methyl; and $Q^5$ and $Q^6$ are the same as or different from each other, and are are each independently methyl, dimethylamido or chloride.

9. The method for preparing a supported hybrid metallocene catalyst according to claim 1, wherein the aluminum-based cocatalyst is supported on the silica support on which the first metallocene compound is supported by the separate-input method in which 60 wt % to 90 wt % of a whole input of the at least one aluminum-based cocatalyst compound is primarily added at a temperature of 110° C. to 130° C., and the rest of the whole input is secondarily added at a temperature of 0° C. to 40° C.

10. The method for preparing a supported hybrid metallocene catalyst according to claim 1, wherein the at least one aluminum-based cocatalyst compound is represented by the following Chemical Formula 6:

[Chemical Formula 6]

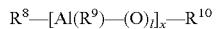

[Chemical Formula 6]

in Chemical Formula 6,
$R^8$, $R^9$, and $R^{10}$ are the same as or different from each other, and are each independently hydrogen, a halogen, a C1 to C20 hydrocarbyl group, or a C1 to C20 hydrocarbyl group substituted with a halogen;
l is 0 or 1; and
x is an integer of 2 or more.

11. The method for preparing a supported hybrid metallocene catalyst according to claim 1, wherein the at least one aluminum-based cocatalyst compound is an alkylaluminoxane-based compound selected from the group consisting of methyl aluminoxane (MAO), ethyl aluminoxane, isobutyl aluminoxane and butyl aluminoxane; or trialkylaluminum selected from the group consisting of trimethylaluminum, triethylaluminum, triisobutylaluminum, trihexylaluminum, trioctylaluminum and isoprenylaluminum, or combination thereof.

12. The method for preparing a supported hybrid metallocene catalyst according to claim 1, wherein a supported amount of the aluminum-based cocatalyst is 5 mmol/g to 15 mmol/g based on 1 g of the silica support.

13. The method for preparing a supported hybrid metallocene catalyst according to claim 1, wherein the silica support is at least one selected from the group consisting of silica, silica-alumina, and silica-magnesia.

14. The method for preparing a supported hybrid metallocene catalyst according to claim 1, further comprising a step of supporting at least one borate-based cocatalyst compound on the silica support on which the aluminum-based cocatalyst is supported.

15. The method for preparing a supported hybrid metallocene catalyst according to claim 14, wherein the at least one borate-based cocatalyst compound is a borate-based compound in the form of tri-substituted ammonium salts, dialkyl ammonium salts, or tri-substituted phosphonium salts.

16. A method for preparing a polyolefin, comprising the step of polymerizing olefinic monomers in the presence of the supported hybrid metallocene catalyst prepared according to claim 1.

17. The method for preparing a polyolefin according to claim 16, wherein the polyolefin has a bulk density of 0.38 g/mL or more, and a molecular weight distribution (Mw/Mn) or 3.5 or more.

18. The method for preparing a polyolefin according to claim 16, wherein the olefinic monomers are ethylene monomers, and the polyolefine has a settling efficiency defined by the following Equation 1 of 20 to 80%:

[Equation 1]

Settling efficiency(%)=an amount of the ethylene monomers used/(an amount of ethylene monomers used used+an solvent content)×100.

19. The method for preparing a supported hybrid metallocene catalyst according to claim 3, wherein the first metallocene compound is the compound represented by the Chemical Formula 1, 2 or 4, and the second metallocene compound is the compound represented by the Chemical Formula 3 or 5.

20. The method for preparing a supported hybrid metallocene catalyst according to claim 1, wherein the first metallocene compound and the second metallocenc compound are used in a ratio of 1:0.5 to 1:2.5 or 1:1 to 1:1.5.

* * * * *